(12) United States Patent
Shimomura et al.

(10) Patent No.: US 8,915,150 B2
(45) Date of Patent: Dec. 23, 2014

(54) TORQUE SENSOR

(71) Applicant: Denso Corporation, Kariya, Aichi-pref. (JP)

(72) Inventors: Osamu Shimomura, Okazaki (JP); Yoshiki Takahashi, Okazaki (JP); Kenji Takeda, Okazaki (JP); Shigetoshi Fukaya, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/897,827

(22) Filed: May 20, 2013

(65) Prior Publication Data

US 2013/0312539 A1 Nov. 28, 2013

(30) Foreign Application Priority Data

May 25, 2012 (JP) ................................. 2012-119745

(51) Int. Cl.
  *G01L 3/00* (2006.01)
  *G01L 3/10* (2006.01)

(52) U.S. Cl.
  CPC ................ *G01L 3/101* (2013.01); *G01L 3/104* (2013.01)
  USPC ....................................... 73/862.325; 73/862

(58) Field of Classification Search
  USPC ......... 73/862.08, 862.325, 862.321, 862.333, 73/862.334
  See application file for complete search history.

(56) References Cited

U.S. PATENT DOCUMENTS

| 4,984,474 A | 1/1991 | Matsushima et al. |
| 2002/0189371 A1 | 12/2002 | Nakane et al. |
| 2009/0078058 A1* | 3/2009 | Aoki et al. ............... 73/862.335 |
| 2010/0084215 A1* | 4/2010 | Sakatani et al. ............. 180/444 |
| 2012/0146627 A1* | 6/2012 | Masson et al. ........... 324/207.21 |
| 2012/0285266 A1 | 11/2012 | Takahashi et al. |

FOREIGN PATENT DOCUMENTS

| JP | 2008-232728 | 10/2008 |
| JP | 2010-181310 | 8/2010 |
| JP | 2012-251814 | 12/2012 |

OTHER PUBLICATIONS

Office Action (3 pages) dated Jul. 17, 2014, issued in corresponding Japanese Application No. 2012-119745 and English translation (5 pages).

* cited by examiner

*Primary Examiner* — Lisa Caputo
*Assistant Examiner* — Jamel Williams
(74) *Attorney, Agent, or Firm* — Nixon & Vanderhye P.C.

(57) ABSTRACT

A torque sensor includes: a torsion bar; a multi-pole magnet; a pair of yokes on an outside of the multi-pole magnet in a radial direction and providing a magnetic circuit in a magnetic field generated by the multi-pole magnet; and a pair of magnetic sensors arranged along a circumferential direction. Each magnetic sensor includes a magnetism sensing part for detecting a magnetic flux density generated in the magnetic circuit, and outputs a detection signal to an external computing device. The magnetic sensors output the detection signals to the external computing device such that the computing device calculates a sum of outputs or a difference of outputs of the magnetic sensors so as to cancel a variation of the outputs produced by a magnetic flux generated from the multi-pole magnet and directly reaching the magnetism sensing parts.

11 Claims, 30 Drawing Sheets

TORQUE SENSOR

CROSS REFERENCE TO RELATED APPLICATION

This application is based on Japanese Patent Application No 2012-119745 filed on May 25, 2012, the disclosure of which is incorporated herein by reference.

TECHNICAL FIELD

The present disclosure relates to a torque sensor for detecting a shaft torque applied to a turning shaft as a change in a magnetic flux density (strength of a magnetic field).

BACKGROUND

There has been known a torque sensor for detecting a shaft torque in an electric power steering device and the like. For example, in a torque sensor described in patent document 1, when torsion is caused in a torsion bar for coupling an input shaft to an output shaft, a magnetic sensor fixed to the torsion bar detects a magnetic flux generated by a change in a relative position in a peripheral direction between a multi-pole magnet and yokes to thereby detect a shaft torque. Here, the multi-pole magnet has N poles and S poles magnetized alternately at intervals of a given magnetizing angle in the peripheral direction. For example, the torque sensor described in the patent document 1 is provided with 12 pairs of N poles and 12 pairs of S poles that is, a total of 24 pairs of poles.

A torque sensor is a sensor for detecting a relative position in a peripheral direction of a multi-pole magnet and yokes. Hence, when the multi-pole magnet and the yokes are integrally turned with respect to a magnetic sensor, that is, when the relative position in the peripheral direction of the multi-pole magnet and the yokes is not changed, the output of the magnetic sensor is desired to be constant.

However, in reality, when the multi-pole magnet and the yokes are integrally turned in the torque sensor described in the patent document 1, an output is varied according to a turn angle. For example, in the case where the multi-pole magnet has 12 pairs of N poles and 12 pairs of S poles, there is caused a variation in output of 12 cycles for one turn. The variation in output becomes a factor of reducing a detection accuracy of the turn angle.

[Patent document 1] JP-A-2003-149062 (corresponding to US 2002/0189371)

SUMMARY

It is an object of the present disclosure to provide a torque sensor detecting a shaft torque applied to a turning shaft as a change in a magnetic flux density (strength of a magnetic field). In the torque sensor, a variation in output caused by a magnetic flux getting out of a multi-pole magnet and directly reaching a magnetism sensing part is reduced when the multi-pole magnet and yokes are integrally turned.

According to a first aspect of the present disclosure, a torque sensor includes: a torsion bar for coaxially coupling between a first shaft and a second shaft and for transforming a torque applied between the first shaft and the second shaft into a torsional displacement; a multi-pole magnet fixed to the first shaft or one end side of the torsion bar and having a plurality of N poles and a plurality of S poles magnetized alternately along a circumferential direction of the multi-pole magnet at every predetermined magnetizing angle; a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; and a pair of magnetic sensors arranged along the circumferential direction. Each magnetic sensor includes a magnetism sensing part for detecting a magnetic flux density generated in the magnetic circuit. Each magnetic sensor outputs a detection signal detected by the magnetism sensing part to an external computing device. The pair of magnetic sensors output the detection signals to the external computing device in such a way that the computing device calculates a sum of outputs or a difference of outputs of the pair of magnetic sensors so as to cancel a variation of the outputs produced by a magnetic flux generated from the multi-pole magnet and directly reaching the magnetism sensing parts.

In the above torque sensor, when the multi-pole magnet and the yokes are integrally turned, the variations in outputs of the respective magnetic sensors are increased or decreased in the same direction with respect to the turn angle. Hence, by computing the difference of the outputs of the magnetic sensors, the variation in output can be cancelled. In this way, according to the torque sensor, the external computing device computes the sum of outputs or the difference of outputs of the pair of magnetic sensors, thereby being able to cancel the variation in output. Hence, the torque sensor can improve the detection accuracy of the turn angle.

According to a second aspect of the present disclosure, a torque sensor includes: a torsion bar for coaxially coupling between a first shaft and a second shaft and for transforming a torque applied between the first shaft and the second shaft into a torsional displacement; a multi-pole magnet fixed to the first shaft or one end side of the torsion bar and having a plurality of N poles and a plurality of S poles magnetized alternately along a circumferential direction of the multi-pole magnet; a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; a magnetic sensor disposed on an outside of the pair of yokes in the radial direction, and including a magnetism sensing part for detecting a magnetic flux density generated in the magnetic circuit; and a magnetic shielding member made of a soft magnetic material. The magnetic shielding member is disposed between the pair of yokes in the axial direction. The magnetic shielding member is disposed on the outside of the multi-pole magnet and on an inside of the magnetism sensing part in the radial direction. The magnetic shielding member shields a magnetic flux generated from the multi-pole magnet and directly reaching the magnetism sensing part of the magnetic sensor.

In the above sensor, it is possible to prevent the magnetic flux from getting out of the multi-pole magnet and passing not through the yokes but through a space and directly reaching the magnetic sensor and hence to reduce a variation in output.

According to a third aspect of the present disclosure, a torque sensor includes: a torsion bar for coaxially coupling between a first shaft and a second shaft and for transforming a torque applied between the first shaft and the second shaft into a torsional displacement; a multi-pole magnet fixed to the first shaft or one end side of the torsion bar and having a plurality of N poles and a plurality of S poles magnetized alternately along a circumferential direction of the multi-pole magnet; a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; a pair of magnetism collecting bodies, each of which includes a main body part and a magnetism collecting part protruding to an outside of the main body part in a radial direction of the multi-pole magnet, for collecting a magnetic flux from the pair of yokes into the magnetism collecting part; a magnetic sensor having a magnetism sensing part, which is arranged between the magnetism collecting parts of the pair of magnetism collecting bodies and detects a magnetic flux density generated in the magnetic circuit, the magnetic sensor having a flat plate shape, in which the magnetism sensing part is arranged; and a spacer for adjusting a distance between the magnetism sensing part and the magnetic sensor in such a way that the magnetism sensing part in the magnetic sensor is arranged at an equal distance from the magnetism collecting parts of the pair of magnetism collecting bodies.

In the above sensor, a variation in output caused by a magnetic flux, which gets out of the multi-pole magnet and passes not through the yokes but through a space and directly reaches the magnetic sensor, tends to become zero at an intermediate position in an axial direction of the magnetism collecting parts. Hence, by disposing the magnetism sensing part at the intermediate position in the axial direction of the magnetism collecting parts by the spacer, the variation in output can be reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
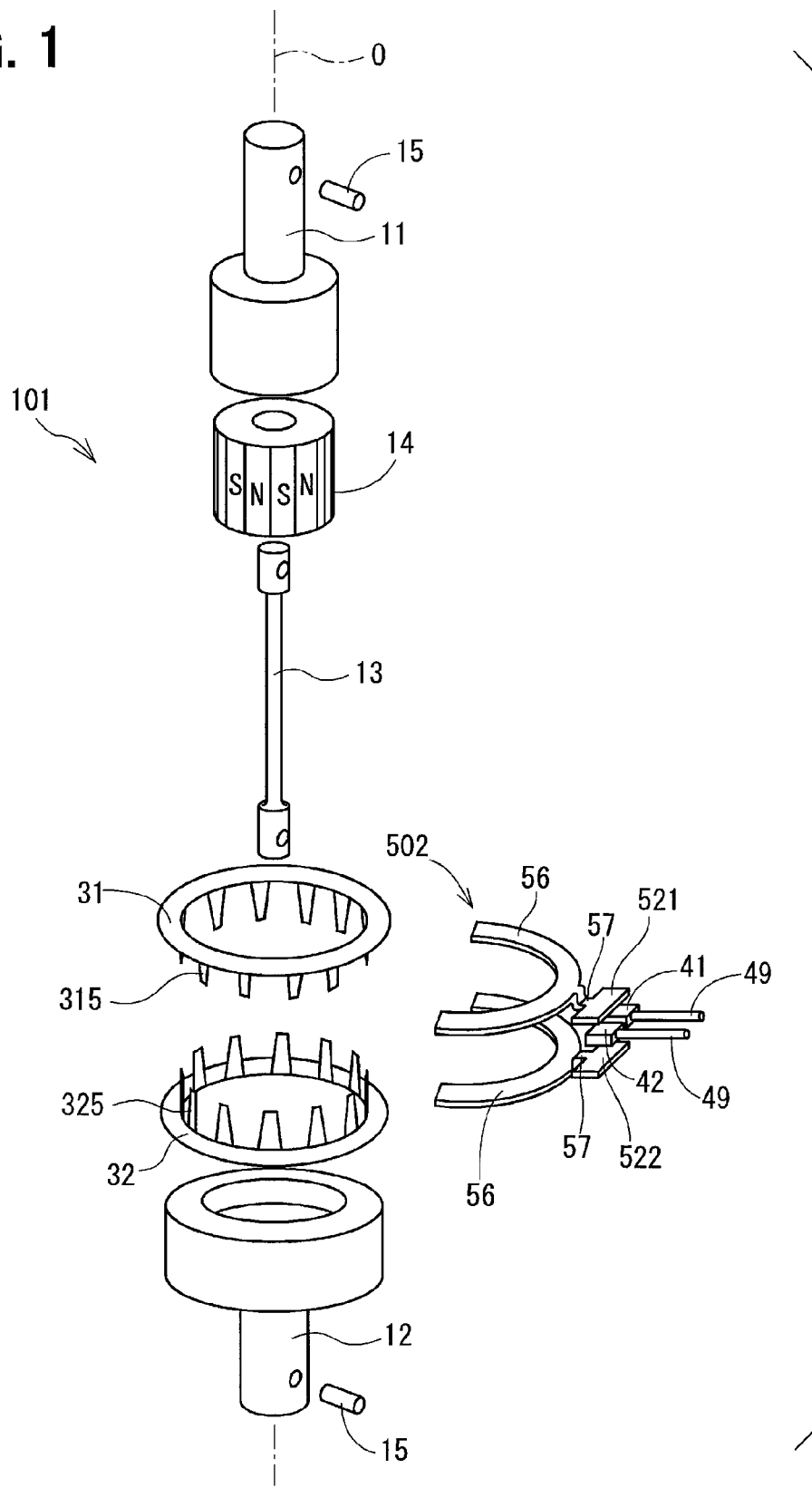
FIG. 1 is a diagram showing a perspective exploded view of a torque sensor according to a first embodiment.

The present inventor made it clear that a variation in output is caused by a magnetic flux getting out of a multi-pole magnet and passing not through yokes but through a space and directly reaching a magnetic sensor. In view of this point, the present inventor provides a torque sensor for detecting a shaft torque applied to a turning shaft as a change in a magnetic flux density.

Hereinafter, torque sensors according to a plurality of embodiments of the present disclosure will be described on the basis of the drawings. In the plurality of embodiments, the substantially same constructions will be denoted by the same reference numerals and their descriptions will be omitted.

[General Construction of a Torque Sensor Applied to an Electric Power Steering Device]

First, a construction common to the torque sensors of the respective embodiments of the present disclosure will be described. As for a reference numeral of the torque sensor, a torque sensor 101 of a first embodiment will be used as a typical example.

Figure 2:
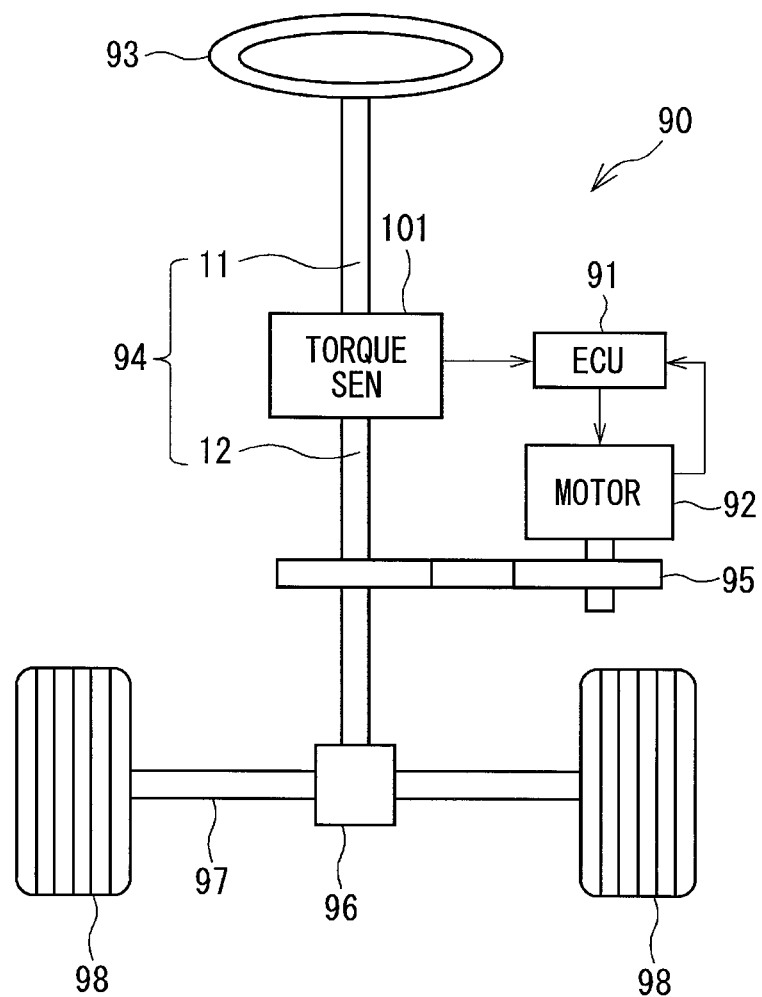
FIG. 2 is a diagram showing a general construction of an electric power steering device to which the torque sensor according to the first embodiment.

As shown in FIG. 2, the torque sensor 101 according to the embodiment of the present disclosure is applied to an electric power steering device for assisting a steering operation of a vehicle.

FIG. 2 shows a general construction of a steering system having an electric power steering device 90. A steering shaft 94 connected to a steering wheel 93 is provided with the torque sensor 101 for detecting a steering wheel toque. The steering shaft 94 has a pinion gear 96 disposed at a tip thereof and the pinion gear 96 is engaged with a rack shaft 97. The rack shaft 97 has a pair of wheels 98 rotatably coupled to both ends thereof via a tie rod or the like. A turning movement of the steering shaft 94 is transformed into a linear movement of the rack shaft 97 by the pinion gear 96, whereby the pair of wheels 98 is steered.

The torque sensor 101 is interposed between an input shaft 11 and an output shaft 12, which construct the steering shaft 94, and detects a steering torque applied to the steering shaft 94 and outputs the detected steering torque to an ECU 91. The ECU 91 controls the output of a motor 92 according to the detected steering torque. A steering assist torque produced by the motor 92 is reduced in speed via a speed reducing gear 95 and is transmitted to the steering shaft 94.

Next, a construction common to the torque sensors of the respective embodiments will be described with reference to FIG. 1 and FIGS. 3A to 5B of the first embodiment.

As shown in FIG. 1, the torque sensor (101) is constructed of a torsion bar 13, a multi-pole magnet 14, one set of yokes 31, 32, one set of magnetism collecting rings (502), a magnetic sensor 41, and the like. Here, the torque sensor and the one pair of magnetism collecting rings are different in reference numeral among the embodiments and hence their reference numerals will be enclosed in parentheses.

The torsion bar 13 has one end side fixed to the input shaft 11 as "a first shaft" and has the other end side fixed to the output shaft 12 as "a second shaft" by a fixing pin 15, respectively, thereby coupling the input shaft 11 to the output shaft 12 coaxially with a turning shaft O. The torsion bar 13 is a bar-shaped elastic member and transforms the steering wheel torque applied to the steering shaft 94 into a torsional displacement.

The multi-pole magnet 14 shaped like a cylinder is fixed to the input shaft 11 and has N poles and S poles magnetized alternately in a peripheral direction. For example, in the present embodiment, the number of N poles and the number of S poles are 12 pairs of poles, respectively, that is, 24 poles in total.

The one set of yokes 31, 32 are ring-shaped bodies made of a soft magnetic material and are fixed to the output shaft 12 on the outside in a radial direction of the multi-pole magnet 14. Each of the yokes 31, 32 has claws 315, 325 of the same number (12 in the present embodiment) as the N poles and the S poles of the multi-pole magnet 14 formed at equal intervals over the whole circumference along the inner edge of the ring. The claws 315 of one yoke 31 and the claws 325 of the other yoke 32 are arranged alternately so as to be shifted in a peripheral direction. In this way, the one yoke 31 is opposite to the other yoke 32 with an air gap in an axial direction. The one set of yokes 31, 32 form a magnetic circuit in a magnetic field generated by the multi-pole magnet 14.

Here, when the torsional displacement is not developed in the torsion bar 13, that is, the steering wheel torque is not applied between the input shaft 11 and the output shaft 12, the multi-pole magnet 14 and the one set of yokes 31, 32 are arranged in such a way that the centers of the claws 315, 325 of the yokes 31, 32 coincide with the boundaries between the N poles and the S poles of the multi-pole magnet 14.

The one set of magnetism collecting rings (502) are formed of a soft magnetic material and include body parts (56), coupling parts (57), and magnetism collecting parts (521, 522). The one set of magnetism collecting rings (502) are disposed in such a way as to be opposite to each other in the axial direction of the torsion bar 13, which is an up and down direction in FIG. 1, and collect magnetic fluxes of the one set of yokes 31, 32 in magnetism collecting parts (521, 522).

At least one magnetic sensor 41 is disposed between the magnetism collecting parts (521, 522). The magnetic sensor 41 transforms a magnetic flux density passing through a magnetism sensing part 410 into a voltage signal and outputs the voltage signal to a lead wire 49. Specifically, a Hall element, a magnetic resistance element or the like can be used as the magnetic sensor 41.

Hereinafter, a construction specific to the one set of magnetism collecting rings, the magnetic sensor, and the like, and an operation and an effect introduced by the construction will be described for each of the embodiments.

[Embodiment of Cancelling a Variation in Output by the Sum of Outputs or by the Difference of Outputs of One Pair of Magnetic Sensors]

A first embodiment to a tenth embodiment of the present disclosure to be described below cancel a variation in output "by the sum of outputs or by the difference of outputs of the one pair of magnetic sensors". Further, in the first embodiment to the tenth embodiment, the ECU 91 functions as "a computing device."

The first embodiment to the tenth embodiment are divided into three groups of (1) group of the first embodiment to the fifth embodiment, (2) group of the sixth embodiment to the ninth embodiment and (3) the tenth embodiment.

In the group of the first embodiment to the fifth embodiment, the embodiment includes one pair of magnetic sensors in one magnetism collecting part of the magnetism collecting ring includes and cancels a variation in output by the sum of outputs of the one pair of magnetic sensors. The first embodiment to the fifth embodiment will be described with reference to FIG. 1 and FIG. 3A to FIG. 10

(First Embodiment)

A construction specific to the first embodiment will be described with reference to FIG. 1 and FIG. 3A to FIG. 5B. One set of magnetism collecting rings 502 of the torque sensors 101 of the first embodiment are constructed of semicircular main body parts 56, magnetism collecting parts 52 protruding outward in a radial direction from the main body parts 56, and coupling parts 57, each of which couples the main body part 56 to the magnetism collecting part 52, and collect magnetic fluxes of the yokes 31, 32 in the magnetism collecting parts 52.

Figure 4:
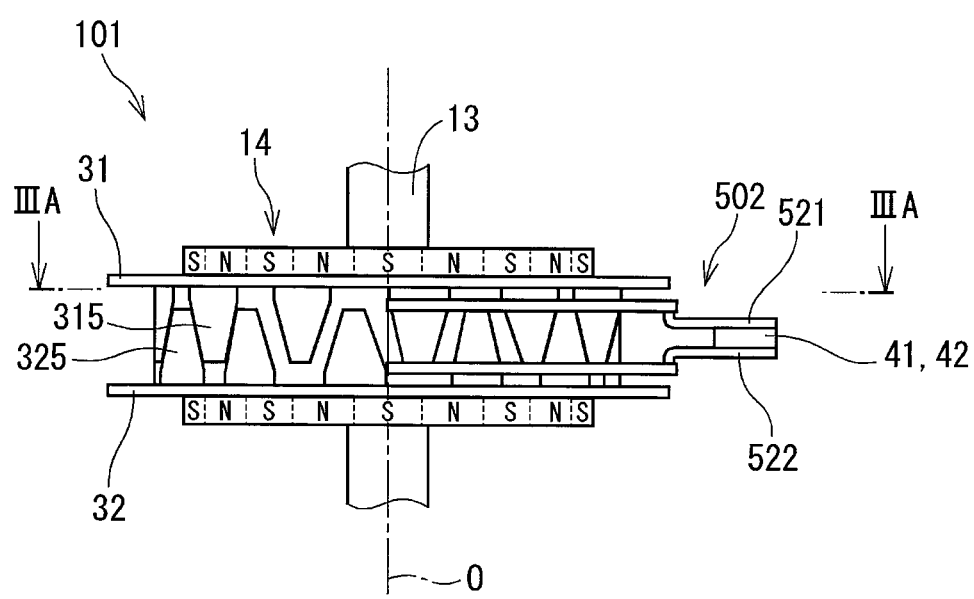
FIG. 4 is a diagram showing a front view of the torque sensor (when viewed from a direction IV in FIG. 3A) to show a neutral state of the torque sensor according to the first embodiment.
Figure 5A:
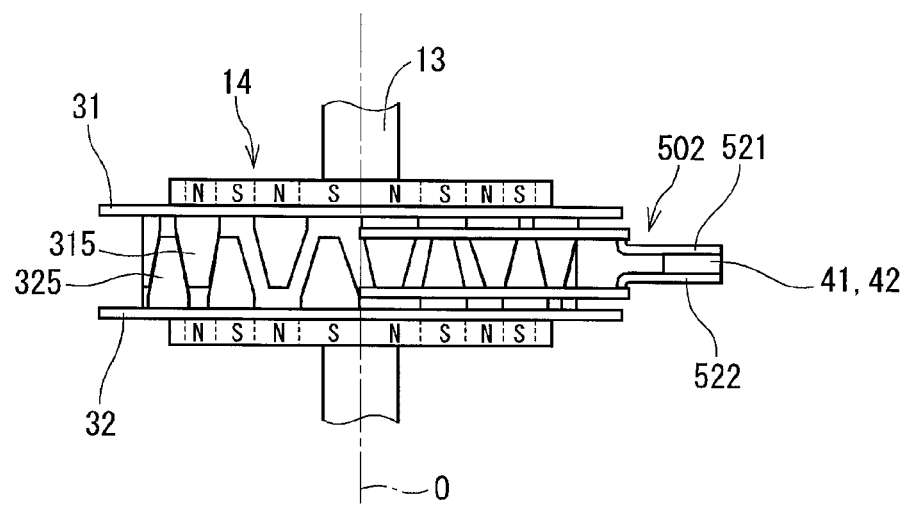
FIG. 5A is a diagram showing a front view of the torque sensor to show a state in which a multi-pole magnet is turned in a left-side direction in the torque sensor according to the first embodiment.
Figure 5B:
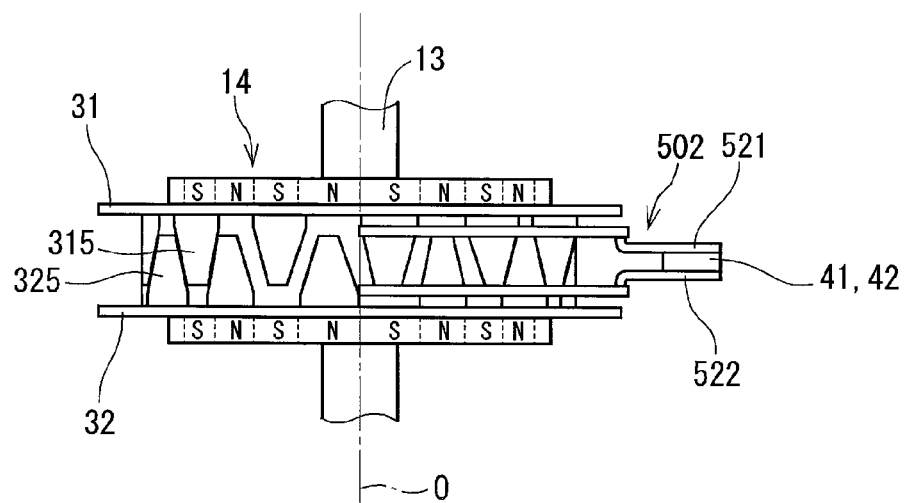
FIG. 5B is a diagram showing a front view of the torque sensor to show a state in which the multi-pole magnet is turned in a right-side direction.

As shown in FIG. 4 and FIGS. 5A and 5B, the main body parts 56 of the one set of magnetism collecting rings 502 are interposed between the one set of yokes 31, 32 in an axial direction. Here, the main body parts 56 are formed in the shape of a semicircle and hence can be assembled from the outside in the radial direction of the yokes 31, 32.

Figure 3A:
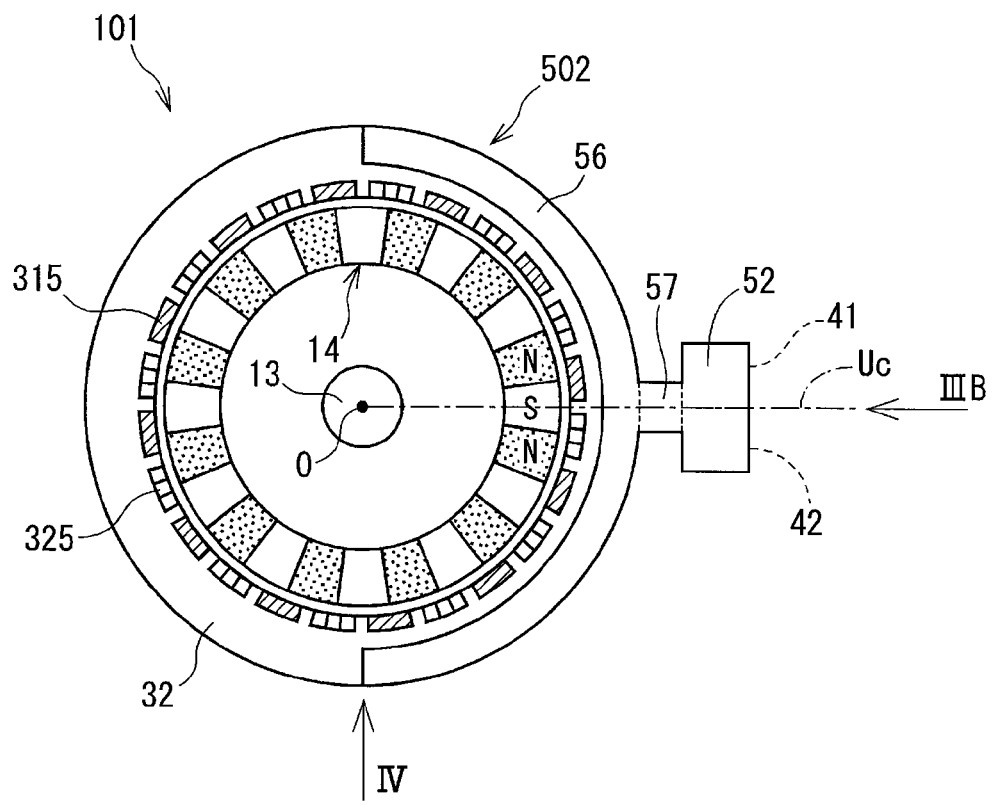
FIG. 3A is a diagram showing a section view of the torque sensor according to the first embodiment.
Figure 3B:
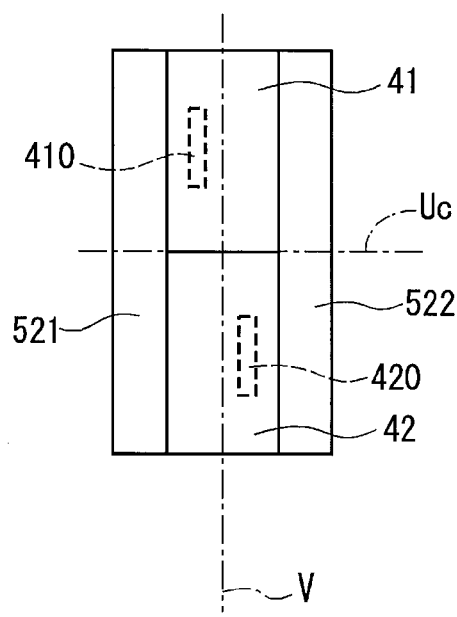
FIG. 3B is a diagram of the torque sensor when viewed from a direction shown by an arrow IIIB in FIG. 3A.

Further, as shown in FIGS. 3A and 3B, the main body parts 56 are formed in such a way that the outer edges of the semicircle coincide with the outer peripheries of the yokes 31, 32, so that when the main body parts 56 are projected in the axial direction, the main body parts 56 overlap the yokes 31, 32.

As shown in FIG. 3A, the center in a peripheral direction of the magnetism collecting part 52 corresponds to an S pole of the multi-pole magnet 14 in a neutral state. In more detail, the magnetism collecting part 52 and the coupling part 57 are disposed symmetrically with respect to a center plane Uc in the peripheral direction including an axis O of the torsion bar 13 and a center in the peripheral direction of the S pole.

Further, as for the magnetism collecting parts 52 of the one set of magnetism collecting rings 502, when an upper magnetism collecting part is discriminated from a lower magnetism collecting part shown in FIG. 1, a numeral "1" is suffixed to the reference numeral of the upper magnetism collecting part and a numeral "2" is suffixed to the reference numeral of the lower magnetism collecting part, which is the same also in the second embodiment to the fifth embodiment to be described below.

As shown in FIG. 3B, two magnetic sensors 41, 42 are mounted adjacently to each other in the peripheral direction between a magnetism collecting part 521 and a magnetism collecting part 522. Each of the magnetic sensors 41, 42 is constructed in the shape of a plate-shaped IC package in which a magnetism sensing part (410 or 420) is molded with resin. Specifically, each of the magnetic sensors 41, 42 is an IC package of a Hall element or a magnetic resistance element.

Here, a generally commercially available magnetic sensor has a magnetism sensing part disposed at a position shifted from a center in a thickness direction of the IC package. In the first embodiment to the tenth embodiment, it is assumed that the magnetic sensor of this construction is used. Further, in the first embodiment to the tenth embodiment, it is assumed that a plurality of magnetic sensors included in one embodiment are equal to each other in the outer size of the IC package, the arrangement of the magnetism sensing part of the IC package and the magnetic performance of the magnetism sensing part.

In the present embodiment, two magnetic sensors 41, 42 are arranged adjacently to each other in such a way that the axial direction of the torsion bar 13 is a thickness direction and that the outer edge of the IC package is symmetric with respect to the center plane Uc in the peripheral direction. Further, the magnetism sensing part 410 of the magnetic sensor 41 is shifted to the magnetism collecting part 521 side with respect to a center plane V in the axial direction passing a center position in the thickness direction, and the magnetism sensing part 420 of the magnetic sensor 42 is shifted to the magnetism collecting part 522 side with respect to the center plane V in the axial direction. In other words, the magnetic sensors 41, 42 are arranged in such a way that the magnetism sensing parts 410, 420 are symmetric to each other with respect to the center plane V in the axial direction.

According to the construction described above, the magnetic sensor 41 and the magnetic sensor 42 of the present embodiment form "one pair of magnetic sensors" in the present disclosure.

Here, the action of the torque sensor 101 will be described with reference to FIG. 4, FIGS. 5A and 5B.

FIG. 4 shows a neutral state in which the steering wheel torque is not applied between the input shaft 11 and the output shaft 12 and in which a torsional displacement is not hence caused in the torsion bar 13. At this time, the S pole is visible at the center of the front of the multi-pole magnet 14 shown in FIG. 4. Further, the centers of the claws 315, 325 of the yokes 31, 32 coincide with the boundaries between the N poles and the S poles of the multi-pole magnet 14.

In this state, the same number of lines of magnetic force get in and out of the claws 315, 325 of the yokes 31, 32 from the N poles and the S poles of the multi-pole magnet 14, so that the lines of magnetic force form a closed loop in each of one yoke 31 and the other yoke 32. Thus, a magnetic flux does not leak into a gap between the yoke 31 and the yoke 32 and hence a magnetic flux density detected by each of the magnetic sensors 41, 42 becomes zero.

When the steering wheel torque is applied between the input shaft 11 and the output shaft 12 to cause the torsional displacement in the torsion bar 13, a relative position between the multi-pole magnet 14 fixed to the input shaft 11 and the one set of yokes 31, 32 fixed to the output shaft 12 is changed in the peripheral direction. FIG. 5A and FIG. 5B show states in which the multi-pole magnet 14 is turned relatively to the yokes 31, 32 from the neutral state. FIG. 5A shows a state in which the multi-pole magnet 14 is turned by 7.5° in a left direction when viewed from the front, whereas FIG. 5B shows a state in which the multi-pole magnet 14 is turned by 7.5° in a right direction when viewed from the front.

In the state shown in FIG. 5A, the claws 315 of the yoke 31 are opposite to the N poles and the claws 325 of the yoke 32 are opposite to the S poles. In the state shown in FIG. 5B, the claws 315 of the yoke 31 are opposite to the S poles and the claws 325 of the yoke 32 are opposite to the N poles. For this reason, the yoke 31 and the yoke 32 have the lines of magnetic force having opposite magnetic polarities increased in number, respectively.

As a result, the magnetic flux density passing through the magnetic sensors 41, 42 is nearly proportional to the amount of torsional displacement of the torsion bar 13 and is reversed in magnetic polarity according to the torsional direction of the torsion bar 13. The magnetic sensor 41 detects the magnetic flux density and outputs the detected magnetic flux density as a voltage signal, whereby the torque sensor 201 detects the steering wheel torque between the input shaft 11 and the output shaft 12.

By the way, in the torque sensor 201 of the construction described above, it is desirable that when the multi-pole magnet 14 and the yokes 31, 32 are integrally turned, the outputs of the magnetic sensors 41, 42 are constant, respectively. However, in reality, the outputs of the magnetic sensors 41, 42 are varied by the effect of the magnetic flux which does not pass through the yokes 31, 32 but passes through a space and directly reaches the magnetism sensing parts 410, 420 of the magnetic sensors 41, 42.

Figure 6A:
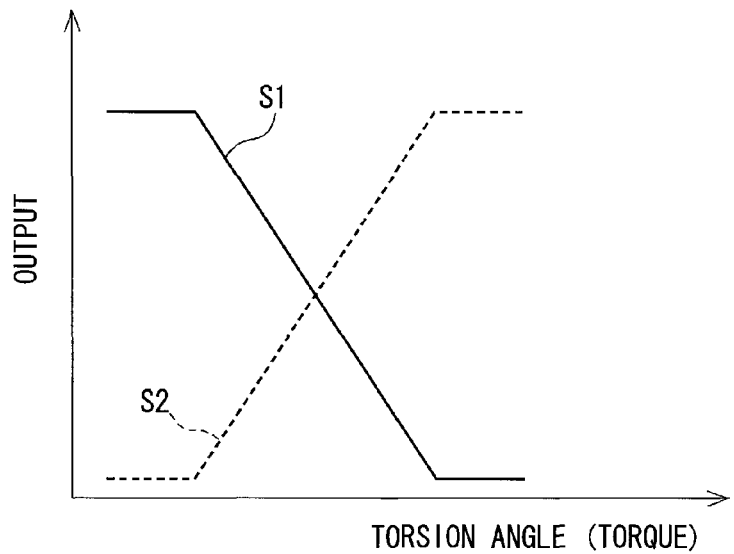
FIGS. 6A and 6B are diagrams showing output characteristics of the torque sensor according to the first embodiment.
Figure 6B:
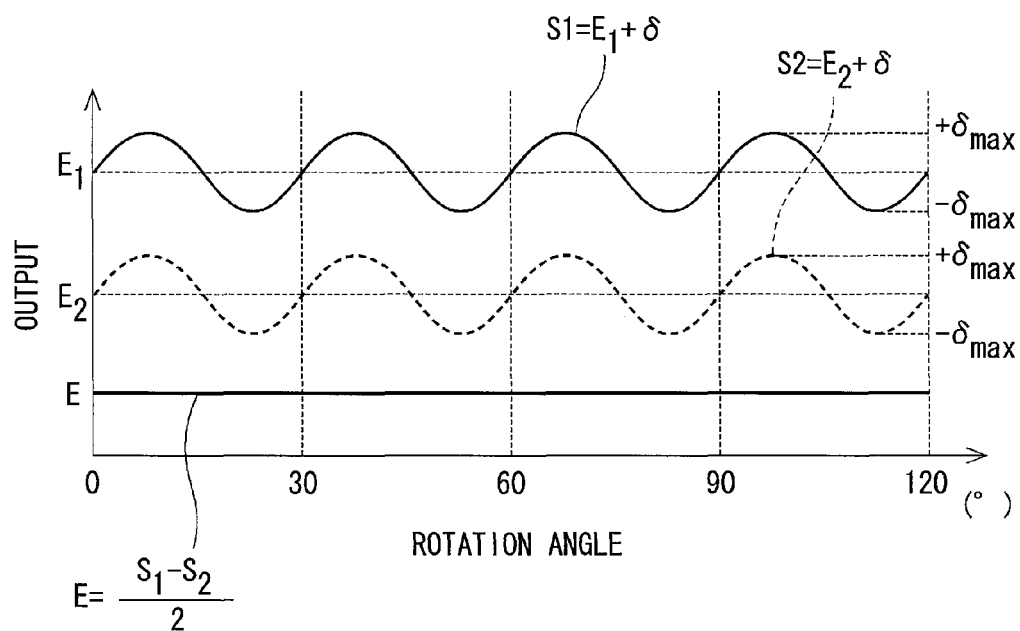

The multi-pole magnet 14 of the present embodiment has 12 pairs of S poles and 12 pairs of N poles, so that as shown in FIG. 6B, a variation in the output appears in a cycle of 30°.

Thus, the torque sensor 101 of the present embodiment is characterized in that the variation in output is cancelled by a difference in output between the magnetic sensors 41, 42 of "one pair of magnetic sensors".

The output characteristics of "one pair of magnetic sensors" of the present embodiment will be described with reference to FIGS. 6A and 6B.

The magnetic sensors 41, 42 are arranged in such a way that the magnetism sensing parts 410, 420 are symmetric to each other in the axial direction with respect to the center plane V in the axial direction, so that an output S1 of the magnetic sensor 41 and an output S2 of the magnetic sensor 42, which are based on the torque applied to the torsion bar 13 or on the torsional angle, are reversed in the sign of slope with respect to a turn angle. On the other hand, it is considered that the magnetic fluxes from the magnetic poles of the multi-pole magnet 14 on the center plane Uc in the peripheral direction pass through space and commonly reach the magnetism sensing parts 410, 420, so that when the multi-pole magnet 14 and the yokes 31, 32 are integrally turned, the variations in output of the respective magnetic sensors 41, 42 to the turn angle are increased or decreased in the same direction.

Here, when it is assumed that: central values of the outputs of the magnetic sensors 41, 42 are E1, E2; value of the variation in output is δ (variable to the turn angle); and amplitude of the variation in output is ±δmax, the outputs S1, S2 of the one pair of magnetic sensors 41, 42 are expressed by the following formulas (1), (2).

$$S1 = E1 + \delta \quad \text{Formula (1)}$$

$$S2 = E2 + \delta \quad \text{Formula (2)}$$

The ECU 91 computes a half value of a difference between the output S1 and the output S2 by the following formula (3).

$$E = (S1 - S2)/2 = (E1 - E2)/2 \quad \text{Formula (3)}$$

In this way, the variation in output can be cancelled.

In this way, in the torque sensor 101 of the present embodiment, the one pair of magnetic sensors 41, 42 outputs a detection signal to the external ECU 91 in such a way that "the ECU 91 computes the difference in output between the one pair of magnetic sensors 41, 42 to thereby cancel the variation in output caused by the magnetic fluxes directly reaching the magnetism sensing parts 410, 20 from the multi-pole magnets 14". Thus, when the multi-pole magnet 14 and the yokes 31, 32 are integrally turned, the detection accuracy of the turn angle can be improved.

Further, the present embodiment is provided with the one set of magnetism collecting rings 502 and hence can efficiently collect the magnetic fluxes of the yokes 31, 32 in the magnetism collecting parts 52. The main body parts 56 of the one set of magnetism collecting rings 502 are formed in the shape of the semicircle and hence can be assembled from the outside in the radial direction of the yokes 31, 32, which hence can improve an assembling performance as compared with magnetism collecting rings formed in the shape of a ring.

Further, the main body parts 56 of the one pair of magnetism collecting rings 502 are interposed between the yokes 31, 32 in the axial direction, and when the main body parts 56 are projected in the axial direction, the main body parts 56 overlap the yokes 31, 32, whereby the amount of magnetic fluxes to be collected can be increased.

Next, the second, the third, and the fourth embodiments of the present disclosure will be described with reference to FIGS. 7A and 7B, FIGS. 8A and 8B, and FIGS. 9A, 9B and 9C. These embodiments are different from the first embodiment in the number and the arrangement of the magnetic sensors interposed between the magnetism collecting parts. Further, as in the case of the first embodiment, when the multi-pole magnet 14 and the yokes 31, 32 are integrally turned, the variation in output can be cancelled by computing a difference in output between one pair of magnetic sensors.

(Second Embodiment)

Figure 7A:
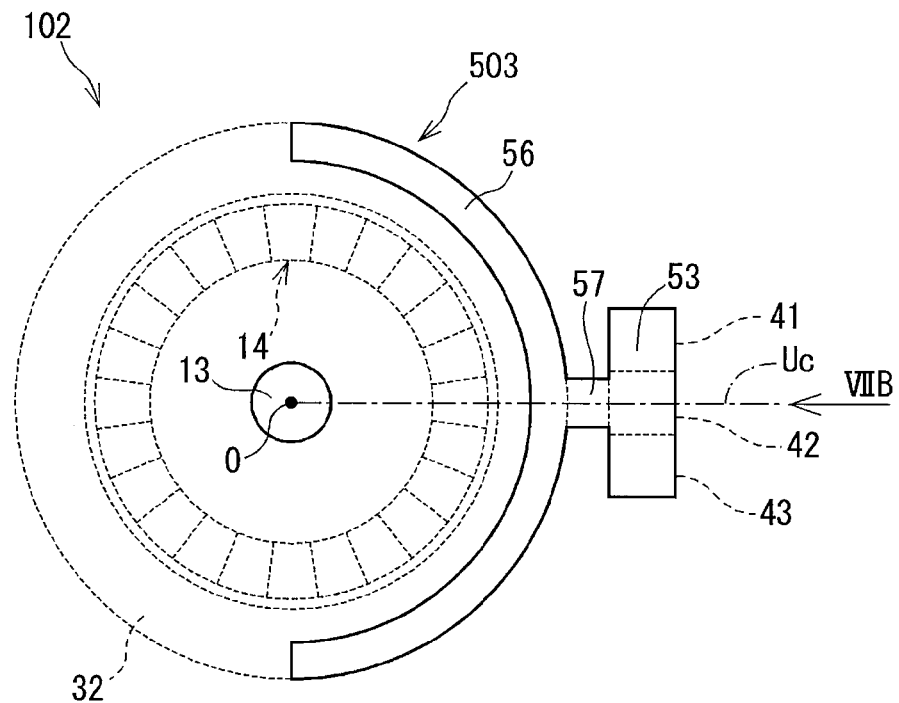
FIG. 7A is a diagram showing a plan view of a torque sensor according to a second embodiment.
Figure 7B:
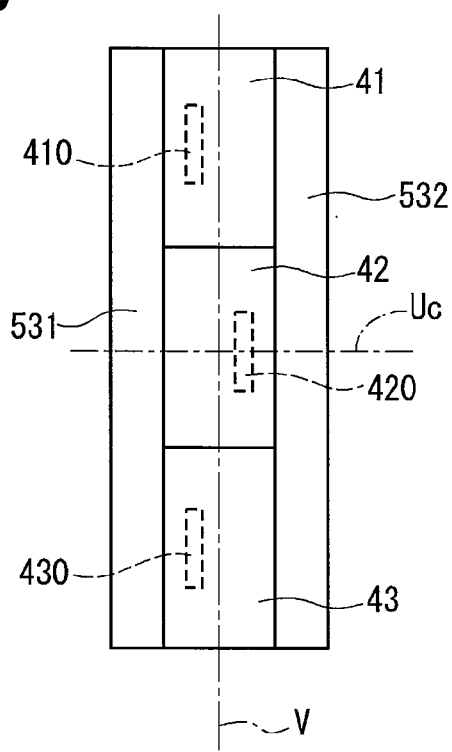
FIG. 7B is a diagram showing a view of the torque sensor when viewed from a direction shown by an arrow VIIB in FIG. 7A.

As shown in FIGS. 7A and 7B, in a torque sensor 102 of the second embodiment, three magnetic sensors 41, 42, 43 are mounted in a line between magnetism collecting parts 531, 532 of magnetism collecting rings 503 which are disposed symmetrically to each other with respect to the center plane Uc in the peripheral direction. The magnetic sensor 41 and the magnetic sensor 42, which are disposed adjacently to each other, are arranged in such a way that the magnetism sensing parts 410, 420 are symmetric to each other in the axial direction with respect to the center plane V in the axial direction. Further, the magnetic sensor 42 and the magnetic sensor 43, which are disposed adjacently to each other, are arranged in such a way that the magnetism sensing parts 420, 430 are symmetric to each other in the axial direction with respect to the center plane V in the axial direction. In this way, the magnetic sensor 41 and the magnetic sensor 42 form "one pair of magnetic sensors", and the magnetic sensor 42 and the magnetic sensor 43 form "one pair of magnetic sensors".

Here, the magnetic sensor 43 corresponds to "a third magnetic sensor". In this way, when one of the magnetic sensors 41, 43 on both ends fails, "one pair of magnetic sensors" are constructed of the remaining two magnetic sensors. Thus, the same effect as in the first embodiment can be produced and hence reliability can be improved.

(Third Embodiment)

Figure 8A:
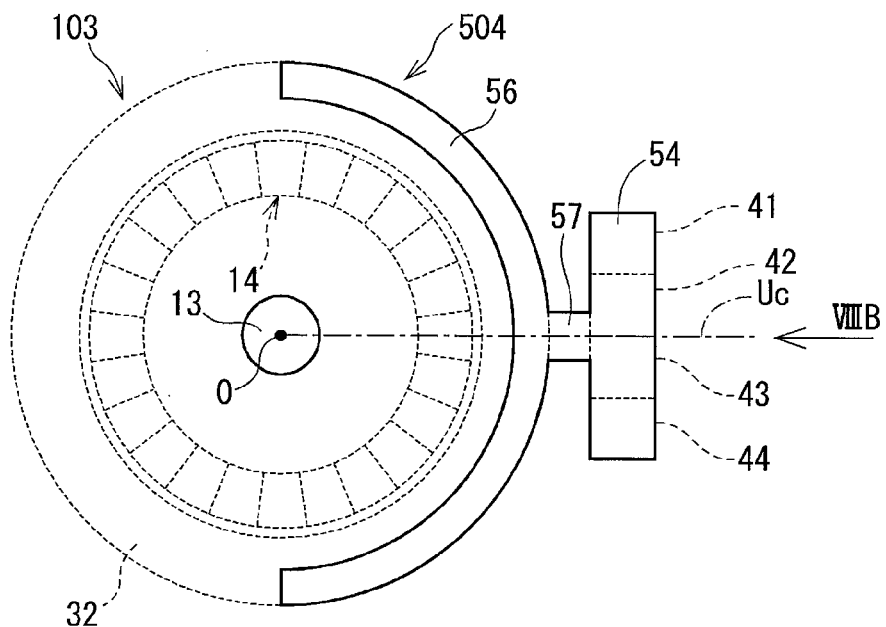
FIG. 8A is a diagram showing a plan view of a torque sensor according to a third embodiment.
Figure 8B:
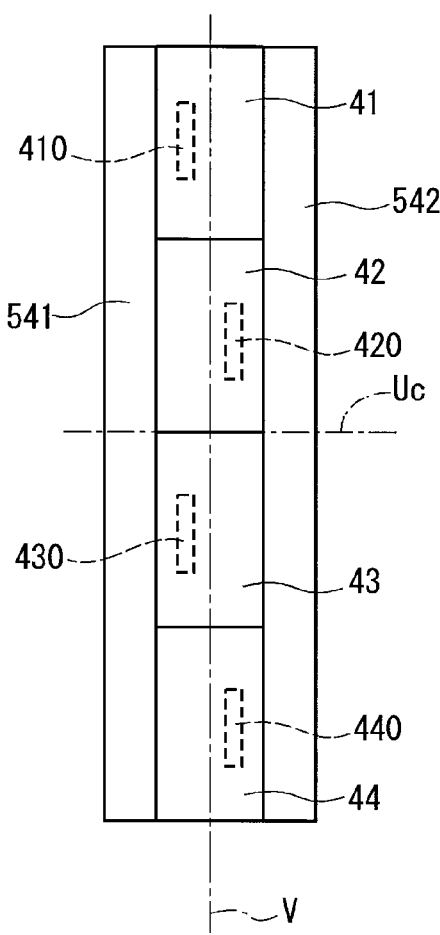
FIG. 8B is a diagram showing a view of the torque sensor when viewed from a direction shown by an arrow VIIIB in FIG. 8A.

As shown in FIGS. 8A and 8B, in a magnetism collecting ring 504 of a torque sensor 103 of the third embodiment, as compared with the magnetism collecting ring 503 of the second embodiment, a fourth magnetic sensor 44 which is adjacent to the magnetic sensor 43 is further mounted between magnetism collecting parts 541, 542. The magnetic sensor 43 and the magnetic sensor 44 are arranged in such a way that the magnetism sensing parts 430, 440 are symmetric to each other in the axial direction with respect to the center plane V in the axial direction thereby forming "one pair of magnetic sensors".

Here, the magnetic sensor 44 corresponds to "a fourth magnetic sensor". In this way, when any one of the four magnetic sensors 41 to 44 fails, "one pair of magnetic sensors" are constructed of the remaining magnetic sensors, so that the same effect as in the first embodiment can be produced. Hence, reliability can be further improved.

(Fourth Embodiment)

Figure 9A:
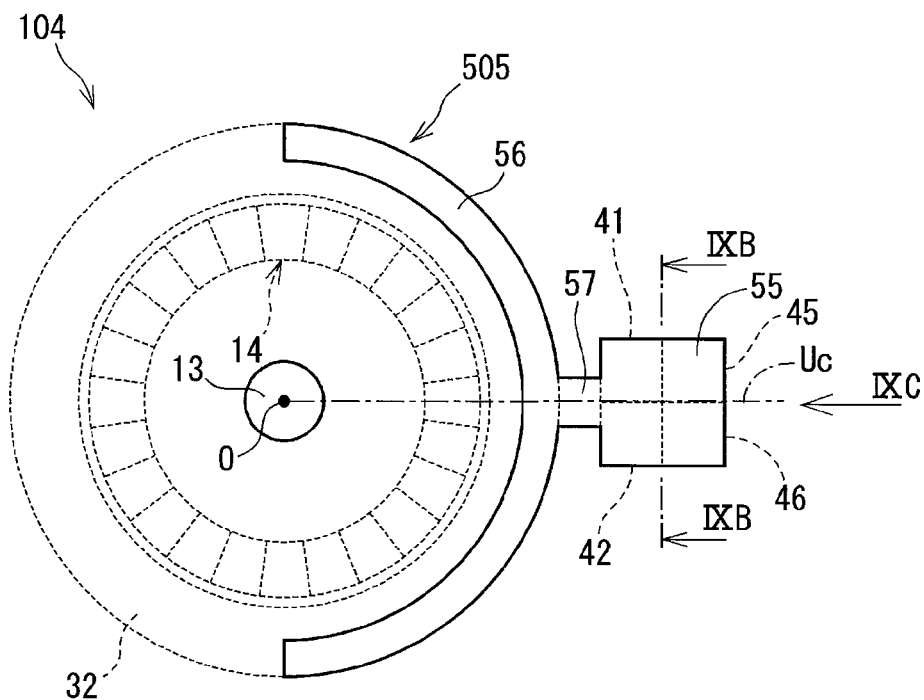
FIG. 9A is a diagram showing a front view of a torque sensor according to a fourth embodiment.
Figure 9B:
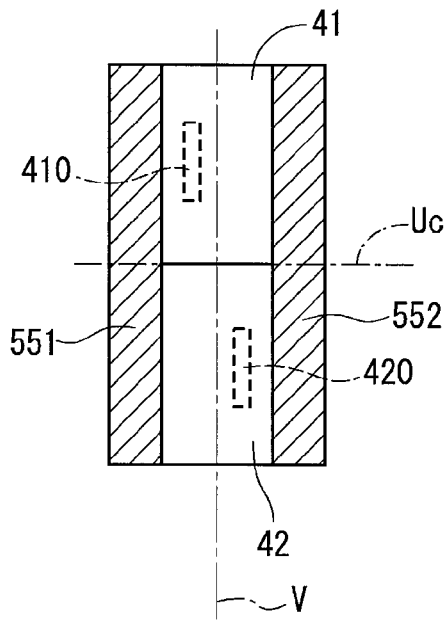
FIG. 9B is a diagram showing a section view of the torque sensor taken along a line IXB-IXB in FIG. 9A.
Figure 9C:
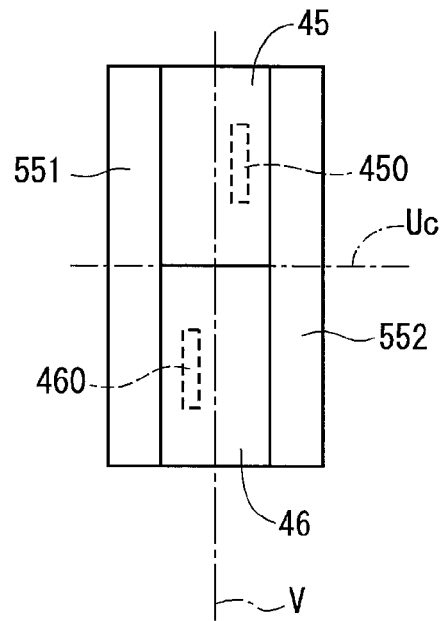
FIG. 9C is a diagram showing a view of the torque sensor when viewed from a direction shown by an arrow IXC in FIG. 9A.

As shown in FIGS. 9A, 9B, and 9C, in a torque sensor 104 of the fourth embodiment, four magnetic sensors 41, 42, 45, 46 are mounted by two in two lines in the peripheral direction between magnetism collecting parts 551, 552 of magnetism collecting rings 505 which are disposed symmetrically to each other with respect to the center plane Uc in the peripheral direction. The magnetic sensor 41 and the magnetic sensor 42 form "one pair of magnetic sensors". Further, the magnetic sensor 45 and the magnetic sensor 46, which are adjacent to each other in the peripheral direction, are arranged in such a way that the magnetism sensing parts 450, 460 are symmetric to each other in the axial direction with respect to the center plane V in the axial direction and form "one pair of magnetic sensors". Further, the magnetic sensor 41 and the magnetic sensor 45, which are disposed adjacently to each other in the radial direction, are arranged in such a way that their magnetism sensing parts 410, 450 are symmetric to each other in the axial direction with respect to the center plane V in the axial direction, and the magnetic sensor 42 and the magnetic sensor 46, which are disposed adjacently to each other in the radial direction, are arranged in such a way that their magnetism sensing parts 420, 460 are symmetric to each other in the axial direction with respect to the center plane V in the axial direction.

In this way, as in the case of the third embodiment, even if any one of the four magnetic sensors 41, 42, 45, 46 fails, "one pair of magnetic sensors" are constructed of the remaining magnetic sensors, so that the same effect as in the first embodiment can be produced. Hence, reliability can be further improved.

(Fifth Embodiment)

Figure 10:
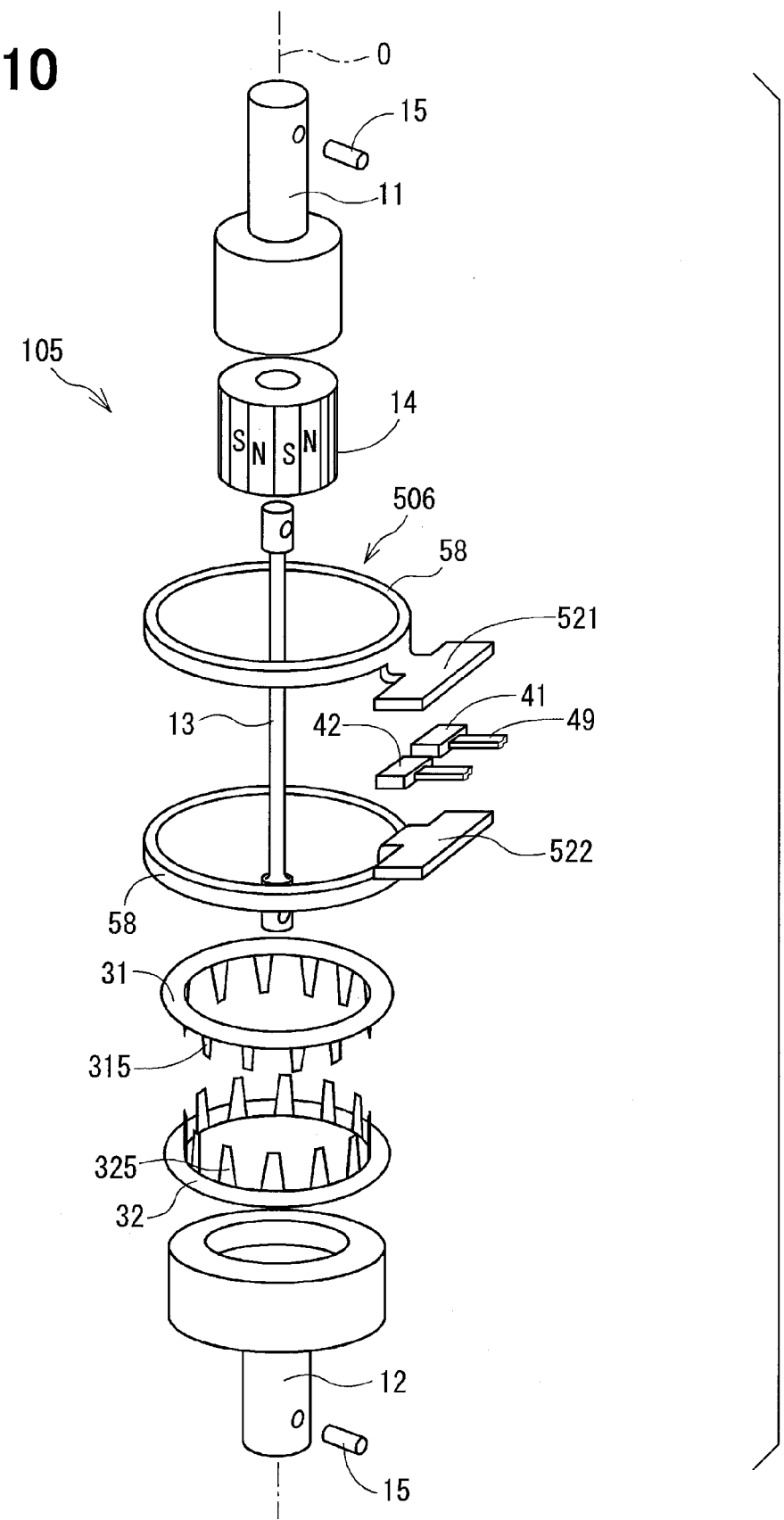
FIG. 10 is a diagram showing a perspective exploded view of a torque sensor according to a fifth embodiment.

As shown in FIG. 10, in a torque sensor 105 of the fifth embodiment, as compared with the torque sensor 101 of the first embodiment, in place of the one set of magnetism collecting rings 502 each having the main body part 56 formed in the shape of the semicircle, one set of magnetism collecting rings 506 each having a main body part 58 formed in the shape of a ring is used Two magnetic sensors 41, 42 are mounted in a line between magnetism collecting parts 521, 522 of magnetism collecting rings 506 as in the case of the first embodiment. Also in this embodiment, the variation in output can be cancelled as in the case of the first embodiment.

In the first to the fifth embodiments, one magnetism collecting part of the magnetism collecting ring is provided with a plurality of magnetic sensors forming "one pair of magnetic sensors". In contrast to this, in the next sixth to the tenth embodiments, a magnetism collecting ring is provided with a plurality of magnetism collecting parts and one magnetism collecting part is mounted with one magnetic sensor, whereby "one pair of magnetic sensors are formed. In the sixth to the ninth embodiments, the variation in output is canceled by the sum of outputs of the one pair of magnetic sensors, whereas in the tenth embodiment, the variation in output is canceled by a difference in output between the one pair of magnetic sensors. The sixth to the tenth embodiments will be described with reference to FIG. 11 to FIG. 18B.

(Sixth Embodiment)

A construction specific to the sixth embodiment will be described with reference to FIG. 11 to FIG. 13. Each of one set of magnetism collecting rings 602 of torque sensor 106 of the sixth embodiment is constructed of a semicircular main body part 66, two magnetism collecting parts 61, 62 protruding in the radial direction from the main body part 66, and a coupling part 67 for coupling the main body part 66 to the respective magnetism collecting parts 61, 62.

Figure 12A:
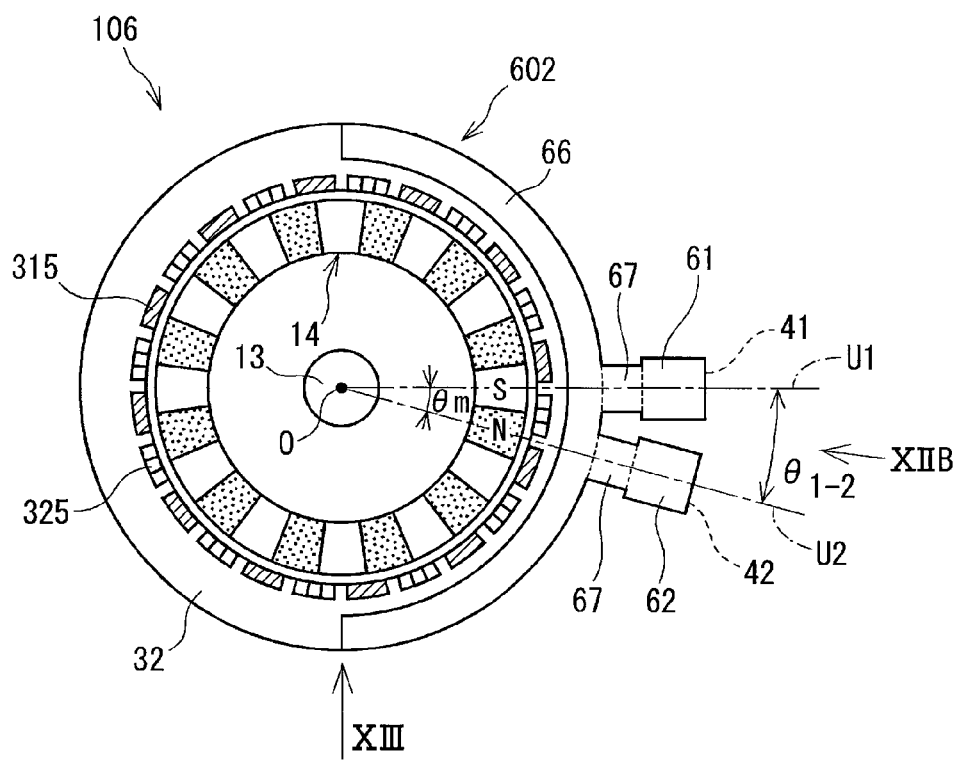
FIG. 12A is a diagram showing a section view of the torque sensor taken along a line XIIA-XIIA in FIG. 13 of the torque sensor according to the sixth embodiment.
Figure 13:
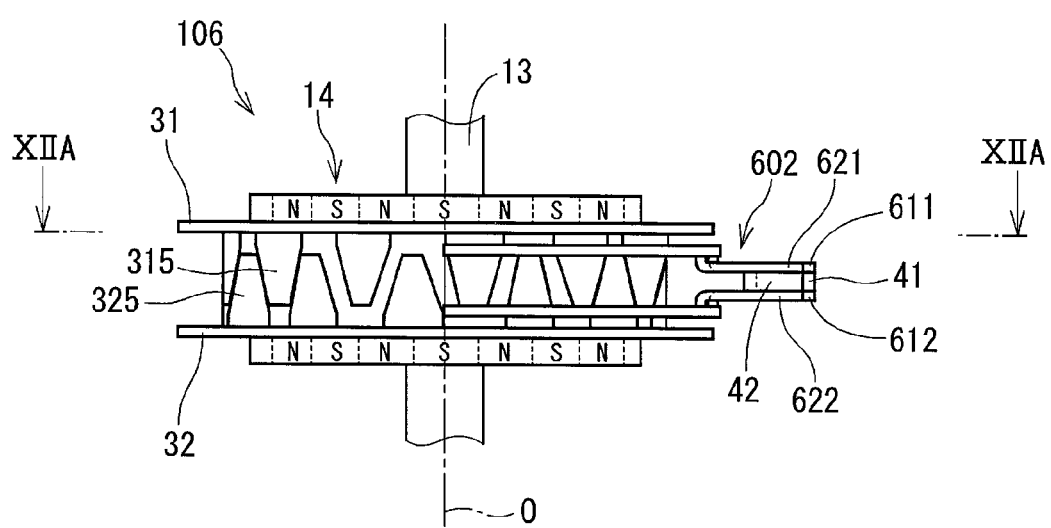
FIG. 13 is a diagram showing a schematic view of the torque sensor to show a neutral state of the torque sensor according to the sixth embodiment.

As shown in FIG. 12A, the magnetism collecting parts 61, 62 are opposite to the S pole and the N pole, which are adjacent to each other, of the multi-pole magnet 14 in a neutral state. In more detail, the magnetism collecting part 61 is disposed on a center plane U1 in the peripheral direction, which includes an axis O of the torsion bar 13 and a center in the peripheral direction of the S pole, whereas the magnetism collecting part 62 is disposed on a center plane U2 in the peripheral direction, which includes the axis O of the torsion bar 13 and a center in the peripheral direction of the N pole.

In the descriptions of the constructions of the seventh to the tenth embodiments, that "a magnetism collecting part is opposite to the S pole or the N pole" device the same construction as this construction.

Figure 11:
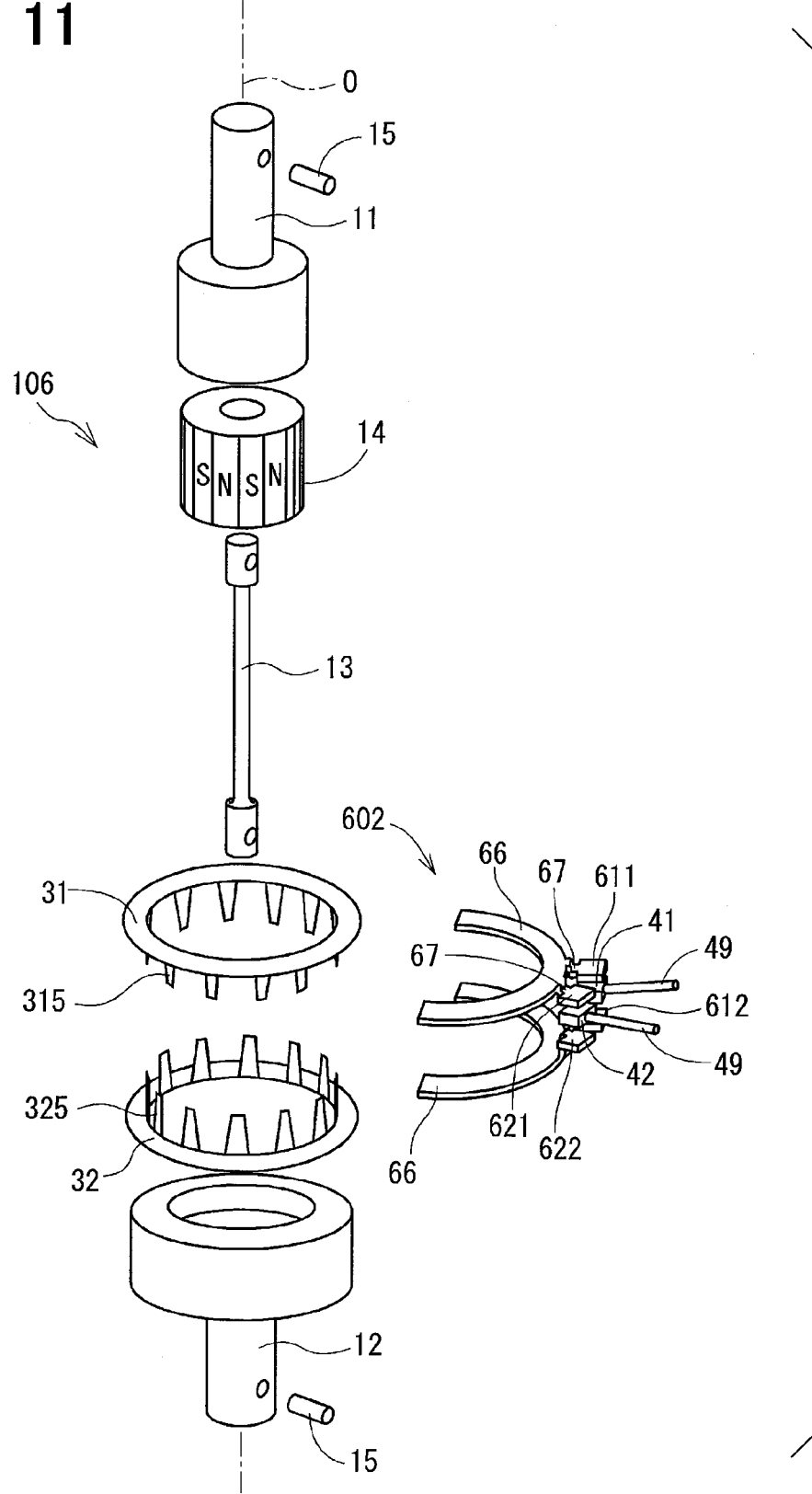
FIG. 11 is an exploded view, in perspective, of a torque sensor according to a sixth embodiment of the present disclosure.

Further, as for the magnetism collecting parts 61, 62 of the one set of magnetism collecting ring 602, when an upper magnetism collecting part is discriminated from a lower magnetism collecting part shown in FIG. 11, a numeral "1" is suffixed to the reference numeral of the upper magnetism collecting part and a numeral "2" is suffixed to the reference numeral of the lower magnetism collecting part, which is the same also in the seventh to the tenth embodiments to be described below.

Figure 12B:
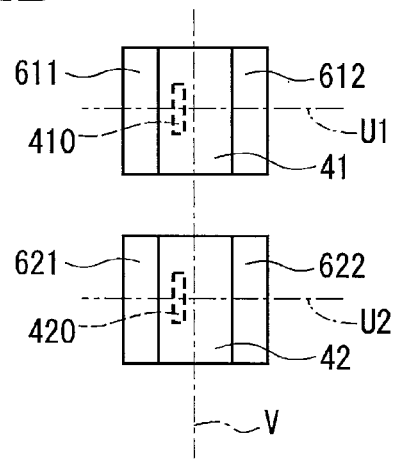
FIG. 12B is a diagram showing a development view of the torque sensor when viewed from a direction shown by an arrow XIIB in FIG. 12A.

The magnetism collecting parts 61, 62 have the magnetic sensors 41, 42 in the axial direction, respectively. As shown in FIG. 12B, the magnetic sensors 41, 42 are arranged in such a way that the magnetism sensing parts 410, 420 are disposed at the same position in the axial direction. In the present embodiment, both of the magnetism sensing parts 410, 420 are positioned on the magnetism collecting parts 611, 612 side with respect to the center plane V in the axial direction passing a center position in the thickness direction of the magnetic sensors 41, 42.

Further, the magnetism sensing parts 410, 420 have their centers in the peripheral direction included in the center planes U1, U2 in the peripheral direction, respectively. The seventh to the tenth embodiments are the same also in this point.

As described above, the magnetic poles of the multi-pole magnet 14, to which the magnetism collecting parts 61, 62 are opposite in the neutral state, are the N pole and the S pole which are adjacent to each other, so that an angle interval $\theta_{1-2}$ between the magnetism sensing part 410 and the magnetism sensing part 420 is equal to an magnetizing angle $\theta_m$ of the multi-pole magnet 14. In this regard, the multi-pole magnet 14 of the present embodiment has 12 pole pairs of S poles and 12 pole pairs of N poles and hence the magnetizing angle $\theta_m$ corresponds to 15°.

According to the construction described above, the magnetic sensor 41 and the magnetic sensor 42 of the present disclosure form "one pair of magnetic sensors".

Figure 14A:
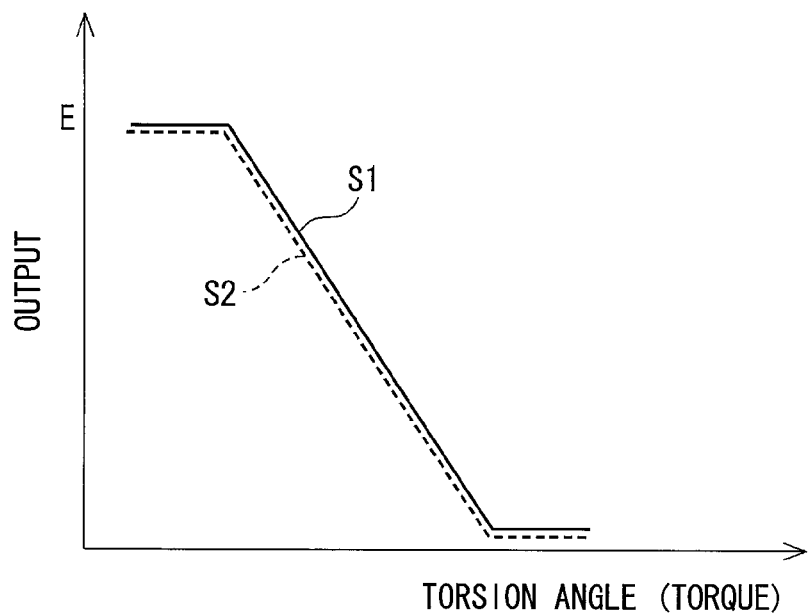
FIGS. 14A and 14B are diagrams showing output characteristics of the torque sensor according to the sixth embodiment.
Figure 14B:
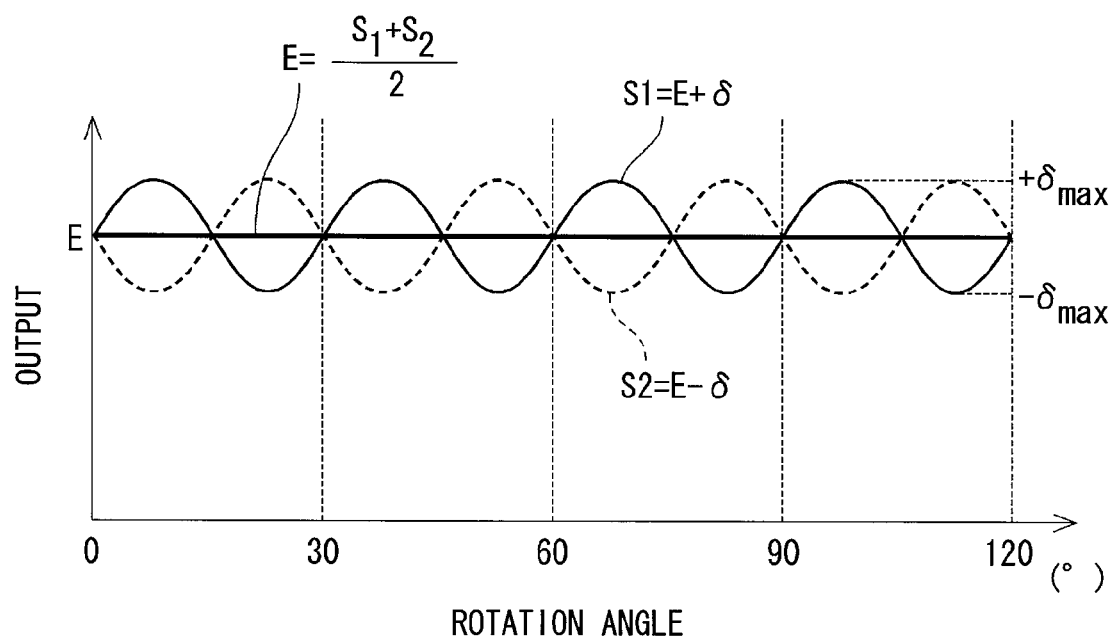

The output characteristics of "one pair of magnetic sensors" of the present embodiment will be described with reference to FIGS. 14A and 14B.

In the magnetic sensors 41, 42, the positions of the magnetism sensing parts 410, 420 are equal to each other in the axial direction, so that an output S1 of the magnetic sensor 41 and an output S2 of the magnetic sensor 42, which are based on a torque applied to the torsion bar 13 or on a torsional angle, are equal to each other. On the other hand, the magnetic sensors 41, 42 are different from each other in the magnetic pole of the multi-pole magnet 14. Hence, when the multi-pole magnet 14 and the yokes 31, 32 are integrally turned, variations in output of the respective magnetic sensors 41, 42 are increased or decreased in the opposite directions with respect to the turn angle.

Here, when it is assumed that central values of the outputs of the magnetic sensors 41, 42 are E; value of the variation in output is δ (variable to the turn angle); and amplitude of the variation in output is ±δMax, the outputs S1, S2 of the one pair of magnetic sensors 41, 42 are expressed by the following formulas (4), (5).

$$S1=E1+δ \quad \text{Formula (4)}$$

$$S2=E2-δ \quad \text{Formula (5)}$$

The ECU 91 computes a half value of the sum of the output S1 and the output S2 by the following formula (6).

$$E=(S1+S2)/2=2E/2 \quad \text{Formula (6)}$$

In this way, the variation in output can be cancelled.

In this way, in the torque sensor 106 of the present embodiment, the one pair of magnetic sensors 41, 42 outputs a detection signal to the external ECU 91 in such a way that "the ECU 91 computes the sum of the outputs of the magnetic sensors 41, 42 to thereby cancel the variation in output caused by the magnetic fluxes directly reaching the magnetism sensing parts 410, 20 from the multi-pole magnets 14". Thus, when the multi-pole magnet 14 and the yokes 31, 32 are integrally turned, the detection accuracy of the turn angle can be improved.

Further, the effect produced by the shape and the arrangement of the magnetism collecting ring 602 is the same as in the first embodiment.

Subsequently, the seventh, the eighth, and the ninth embodiments of the present disclosure will be described with reference to FIGS. 15A and 15B, FIG. 16A and 16B, and FIGS. 17A and 17B. These embodiments are different from the sixth embodiment in the number and the arrangement of magnetism collecting parts disposed in the magnetism collecting ring. Further, as in the case of the sixth embodiment, when the multi-pole magnet 14 and the yokes 31, 32 are integrally turned, by computing the sum of the outputs of one pair of magnetic sensors, the variation in output can be cancelled.

(Seventh Embodiment)

Figure 15A:
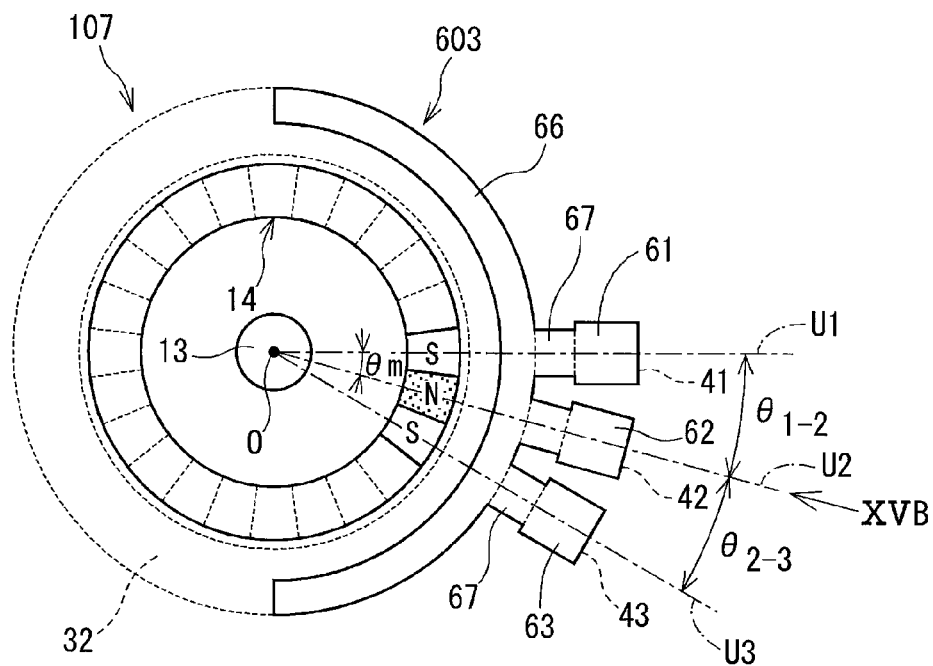
FIG. 15A is a diagram showing a plan view of a torque sensor according to a seventh embodiment.
Figure 15B:
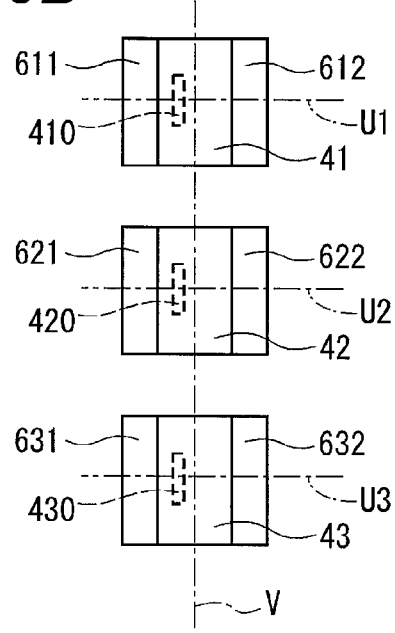
FIG. 15B is a diagram showing a development view of the torque sensor when viewed from a direction shown by an arrow XVB in FIG. 15A.

As shown in FIGS. 15A and 15B, in a torque sensor 107 of the seventh embodiment, a magnetism collecting ring 603 is provided with three magnetism collecting parts 61, 62, 63. The magnetism collecting parts 61, 62, 63 are disposed on center planes U1, U2, U3 in the peripheral direction and are opposite to the S pole, the N pole, and the S pole, which are adjacent to each other, of the multi-pole magnet 14 in the neutral state, respectively. The magnetic sensors 41, 42, 43 are arranged in the magnetism collecting parts 61, 62, 63, respectively, in such a way that magnetism sensing parts 410, 420, 430 are at the same position in the axial direction.

Further, an angle interval $θ_{1-2}$ between the magnetism sensing part 410 and the magnetism sensing part 420 and an angle interval $θ_{2-3}$ between the magnetism sensing part 420 and the magnetism sensing part 430 are equal to the magnetizing angle $θ_m$ of the multi-pole magnet 14, respectively. In this way, the magnetic sensor 41 and the magnetic sensor 42 form "one pair of magnetic sensors", and the magnetic sensor 42 and the magnetic sensor 43 form "one pair of magnetic sensors".

Here, the magnetic sensor 43 corresponds to "a third magnetic sensor". In this way, when any one of the magnetic sensors 41, 43 on both ends fails, "one pair of magnetic sensors" are constructed of remaining two magnetic sensors and hence the same effect as in the sixth embodiment can be produced. Hence, reliability can be improved.

(Eighth Embodiment)

Figure 16A:
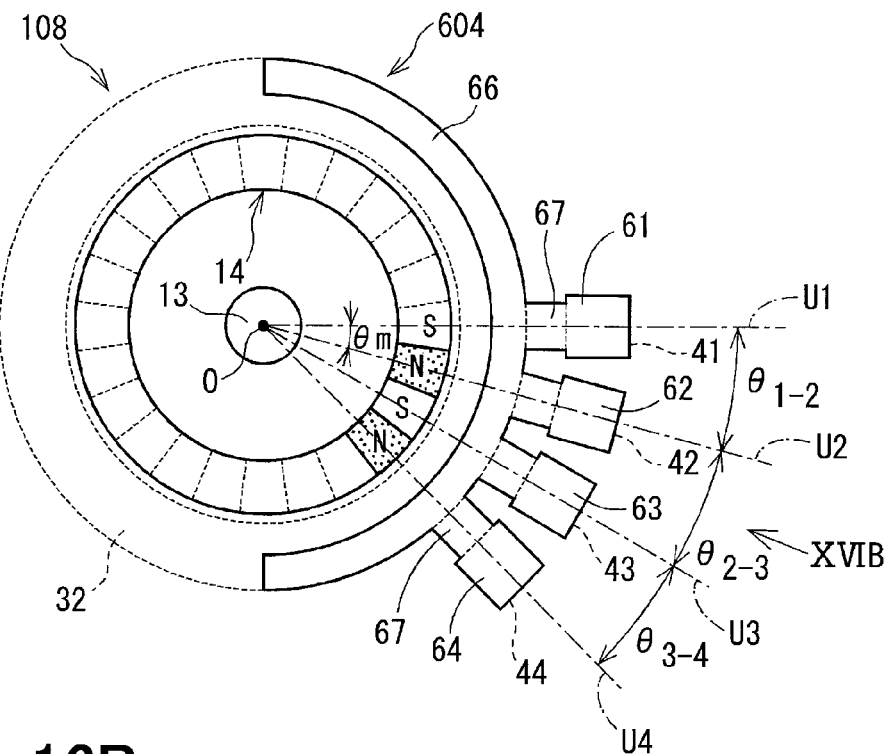
FIG. 16A is a diagram showing a plan view of a torque sensor according to an eighth embodiment.
Figure 16B:
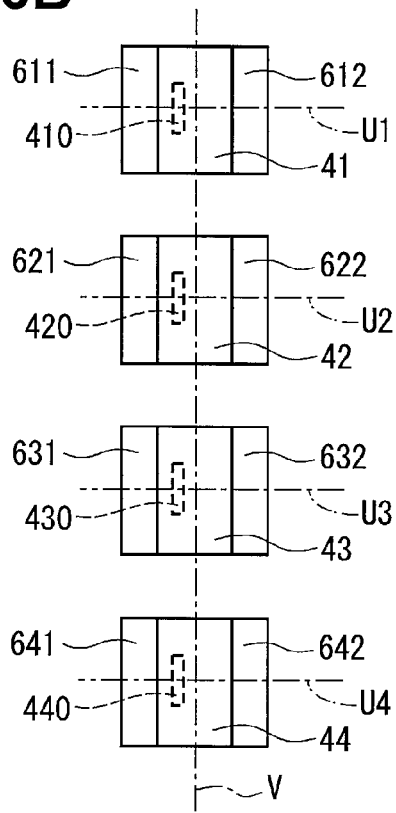
FIG. 16B is a diagram showing a development view of the torque sensor when viewed from a direction shown by an arrow XVIB in FIG. 16A.

As shown in FIGS. 16A and 16B, a magnetism collecting ring 604 of a torque sensor 108 of the eighth embodiment is further provided with a fourth magnetism collecting part 64 as compared with the magnetism collecting ring 603 of the seventh embodiment. The magnetism collecting part 64 is disposed on a center plane U4 in the peripheral direction and is opposite to the N pole which is adjacent to the S pole, to which the magnetism collecting part 63 is opposite, of the multi-pole magnet 14 in the neutral state. The magnetic sensor 44 mounted in the magnetism collecting part 64 is arranged in such a way that a magnetism sensing part 440 is at the same position in the axial direction as the magnetism sensing parts 410, 420, 430 of the magnetic sensors 41, 42, 43. Further, an angle interval $θ_{3-4}$ between the magnetism sensing part 430 and the magnetism sensing part 440 is also equal to the magnetizing angle $θ_m$ of the multi-pole magnet 14. In this way, the magnetic sensor 43 and the magnetic sensor 44 form "one pair of magnetic sensors".

Here, the magnetic sensor 44 corresponds to "a fourth magnetic sensor". In this way, when any one of the four magnetic sensors 41 to 44 fails, "one pair of magnetic sensors" are constructed of remaining two magnetic sensors and hence the same effect as in the sixth embodiment can be produced. Hence, reliability can be further improved.

(Ninth Embodiment)

Figure 17A:
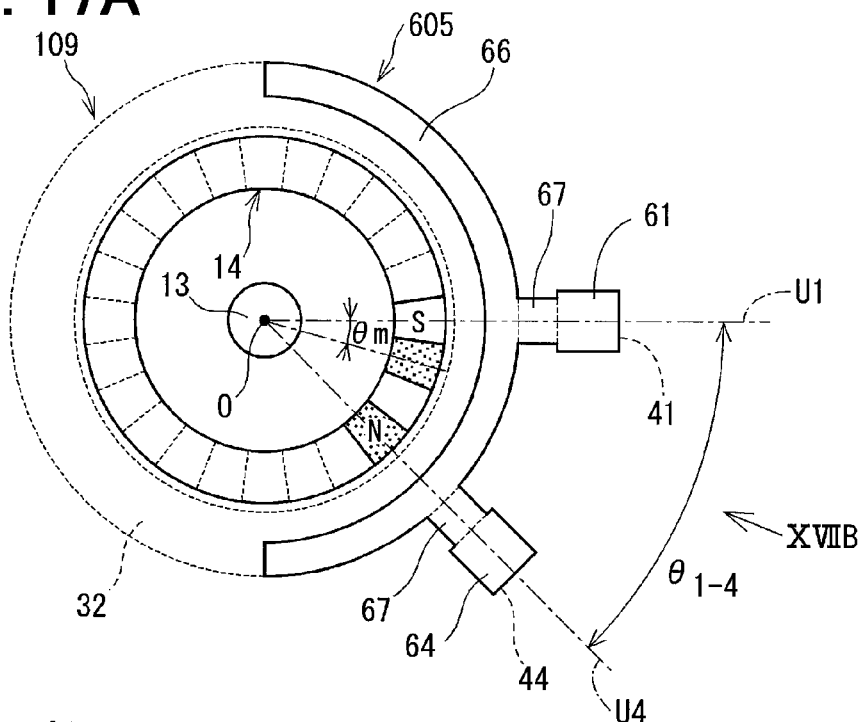
FIG. 17A is a diagram showing a plan view of a torque sensor according to a ninth embodiment.
Figure 17B:
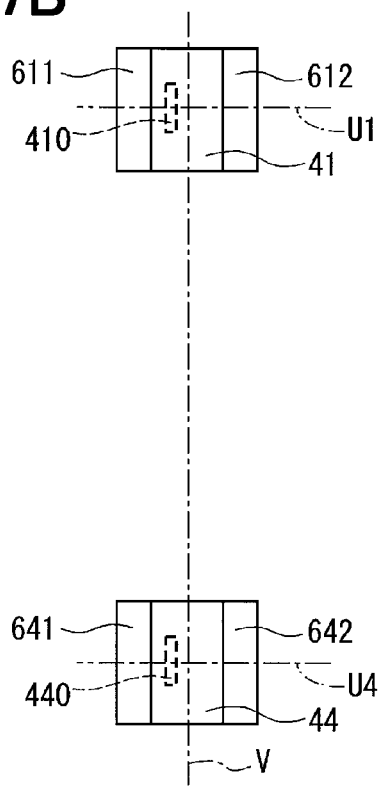
FIG. 17B is a diagram showing a development view of the torque sensor when viewed from a direction shown by an arrow XVIIB in FIG. 17A.

As shown in FIGS. 17A and 17B, in a torque sensor 109 of the ninth embodiment, a magnetism collecting ring 605 is provided with two magnetism collecting parts 61, 64. The magnetism collecting parts 61, 64 are disposed on the center planes U1, U4 in the peripheral direction and are opposite to the S pole and the N pole, between which one N pole and one S pole are arranged, of the multi-pole magnet 14 in the neutral state. The magnetic sensor 41 mounted in the magnetism collecting part 61 and the magnetic sensor 44 mounted in the magnetism collecting part 64 are arranged in such a way that their magnetism sensing pars 410, 440 are at the same position in the axial direction.

Further, an angle interval an angle interval $θ_{1-4}$ between the magnetism sensing part 410 and the magnetism sensing part 440 is three times the magnetizing angle $θ_m$ of the multi-pole magnet 14. In other words, while a ratio of the angle interval between the magnetism sensing parts of the magnetic sensors to the magnetizing angle $θ_m$ of the multi-pole magnet 14 is "one" in the sixth embodiment to the eighth embodiment, the ratio becomes an odd number times larger than one in the ninth embodiment.

In this way, in a case where the angle interval between the magnetism sensing parts of the one pair of magnetic sensors is an odd number times the magnetizing angle $θ_m$ of the multi-pole magnet 14, the one pair of magnetic sensors are opposite to the magnetic poles different from each other. Hence, if the one pair of magnetic sensors are arranged in such a way that the magnetism sensing parts are at the same position in the axial direction, when the multi-pole magnet 14 and the yokes 31, 32 are integrally turned, the variations in output of the respective magnetic sensors are increased or decreased in opposite directions to the turn angle. For this reason, by computing the sum of the outputs of the magnetic sensors, the variations in outputs can be cancelled.

Further, when one pair of magnetic sensors are arranged in such a way that the angle interval between their magnetism sensing parts is an odd number (three or more) times the magnetizing angle $θ_m$ of the multi-pole magnet 14, as compared with a case where the angle interval is equal to the magnetizing angle $\theta_m$ of the multi-pole magnet 14, the magnetic sensors can be further separated from each other and hence the effect of leak of the magnetic flux can be reduced.

Next, the tenth embodiment of the present disclosure will be described with reference to FIGS. 18A and 18B.

(Tenth Embodiment)

Figure 18A:
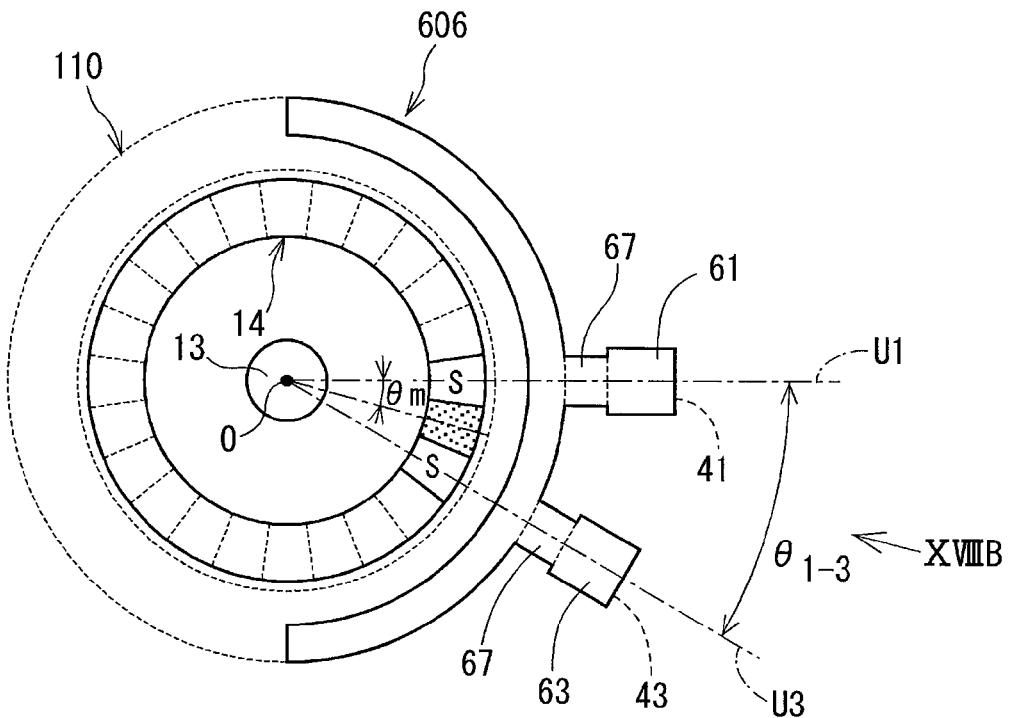
FIG. 18A is a diagram showing a plan view of a torque sensor according to a tenth embodiment.
Figure 18B:
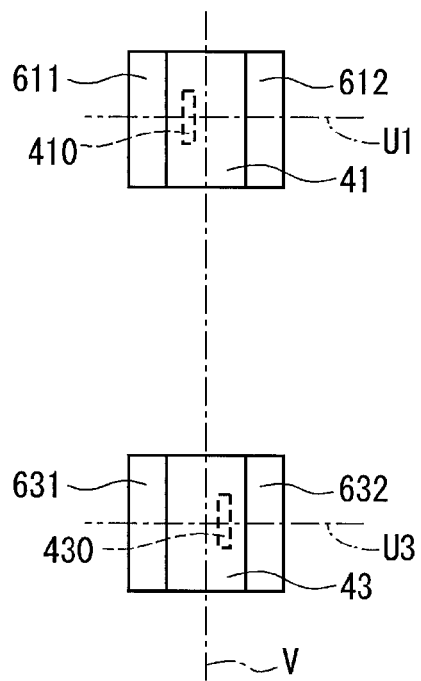
FIG. 18B is a diagram showing a development view of the torque sensor when viewed from a direction shown by an arrow XVIIIB in FIG. 18A.

As shown in FIGS. 18A and 18B, in a torque sensor 110 of the tenth embodiment, a magnetism collecting ring 606 is provided with two magnetism collecting parts 61, 63. The magnetism collecting parts 61, 63 are disposed on the center planes U1, U3 in the peripheral direction and are opposite to the S pole and the S pole, between which one N pole is arranged, of the multi-pole magnet 14 in the neutral state. The magnetic sensor 41 mounted in the magnetism collecting part 61 and the magnetic sensor 43 mounted in the magnetism collecting part 63 are arranged in such a way that their magnetism sensing pars 410, 430 are symmetric to each other in the axial direction with respect to the center plane V in the axial direction.

Further, an angle interval $\theta_{1-3}$ between the magnetism sensing part 410 and the magnetism sensing part 430 is equal to two times the magnetizing angle $\theta_m$ of the multi-pole magnet 14. In other words, while a ratio of the angle interval between the magnetism sensing parts of the magnetic sensors to the magnetizing angle $\theta_m$ of the multi-pole magnet 14 is an odd number times in the sixth embodiment to the ninth embodiments, the ratio becomes an even number times in the tenth embodiment.

In this way, in a case where the angle interval between the magnetism sensing parts of one pair of magnetic sensors is the even number times the magnetizing angle $\theta_m$ of the multi-pole magnet 14, the one pair of magnetic sensors are opposite to the magnetic poles of the same kind, respectively. Hence, if one pair of magnetic sensors are arranged in such a way that their magnetism sensing parts are symmetric to each other in the axial direction with respect to the center plane V in the axial direction, when the multi-pole magnet 14 and the yokes 31, 32 are integrally turned, the variations in output of the respective magnetic sensors are increased or decreased in the same direction to the turn angle. For this reason, the variations in output can be cancelled by computing a difference in output between the magnetic sensors.

(Modified Example of the Embodiment of Cancelling a Variation in Output by the Sum of Outputs or by the Difference of Outputs of One Pair of Magnetic Sensors)

A torque sensor having one pair of magnetic sensors and for cancelling the variation in output by the sum of outputs or by the difference of outputs of the one pair of magnetic sensors does not need to be provided with one set of magnetism collecting rings as "one set of magnetism collecting bodies".

(Embodiment for Reducing a Variation in Output by the Use of a Magnetic Shielding Member)

Next, an 11th embodiment to a 14th embodiment of the present disclosure for reducing a variation in output by the use of a magnetic shielding member will be described with reference to FIG. 19 to FIG. 28.

(11th Embodiment)

A construction specific to the 11th embodiment will be described with reference to FIG. 19 to FIG. 23. Each of one set of magnetism collecting rings 501 of a torque sensor 201 of the 11th embodiment is constructed of a semicircular main body part 56, a magnetism collecting part 51 protruding in the radial direction from the main body part 56, and a coupling part 57 for coupling the main body part 56 to the magnetism collecting part 51 and collects magnetic flux of yokes 31, 32 in the magnetism collecting part 51. The set of magnetism collecting rings 501 correspond to "one set of magnetism collecting bodies".

Figure 21:
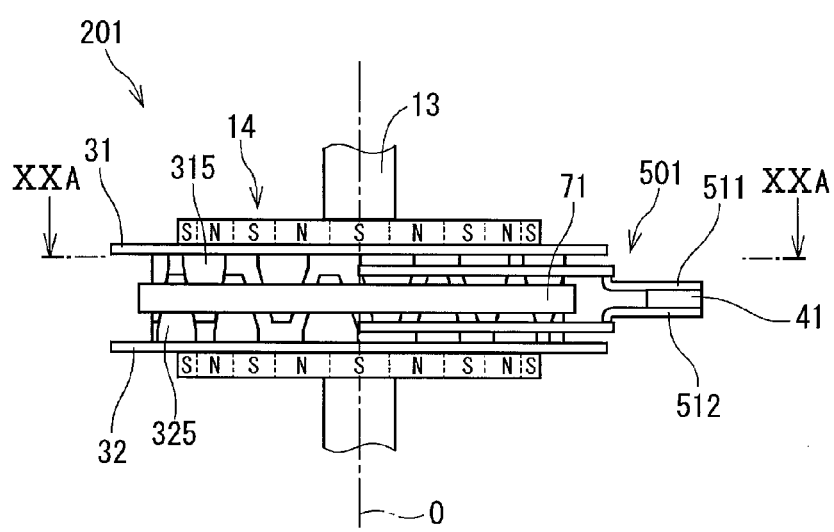
FIG. 21 is a diagram showing a front view of the torque sensor to show a neutral state of the torque sensor according to the 11th embodiment.

As shown in FIG. 21 and FIG. 22, the main body parts 56 of the set of magnetism collecting rings 501 are interposed between one set of yokes 31, 32 in the axial direction. Here, the main body parts 56 are formed in the shape of a semicircle and hence can be assembled from the outside in the radial direction of the yokes 31, 32.

Further, as shown in FIGS. 20A and 20B, the main body parts 56 are formed in such a way that the outer edge of the semicircle coincides with the outer peripheries of the yokes 31, 32, so that when the main body parts 56 are projected in the axial direction, the main body parts 56 overlap the yokes 31, 32.

Figure 19:
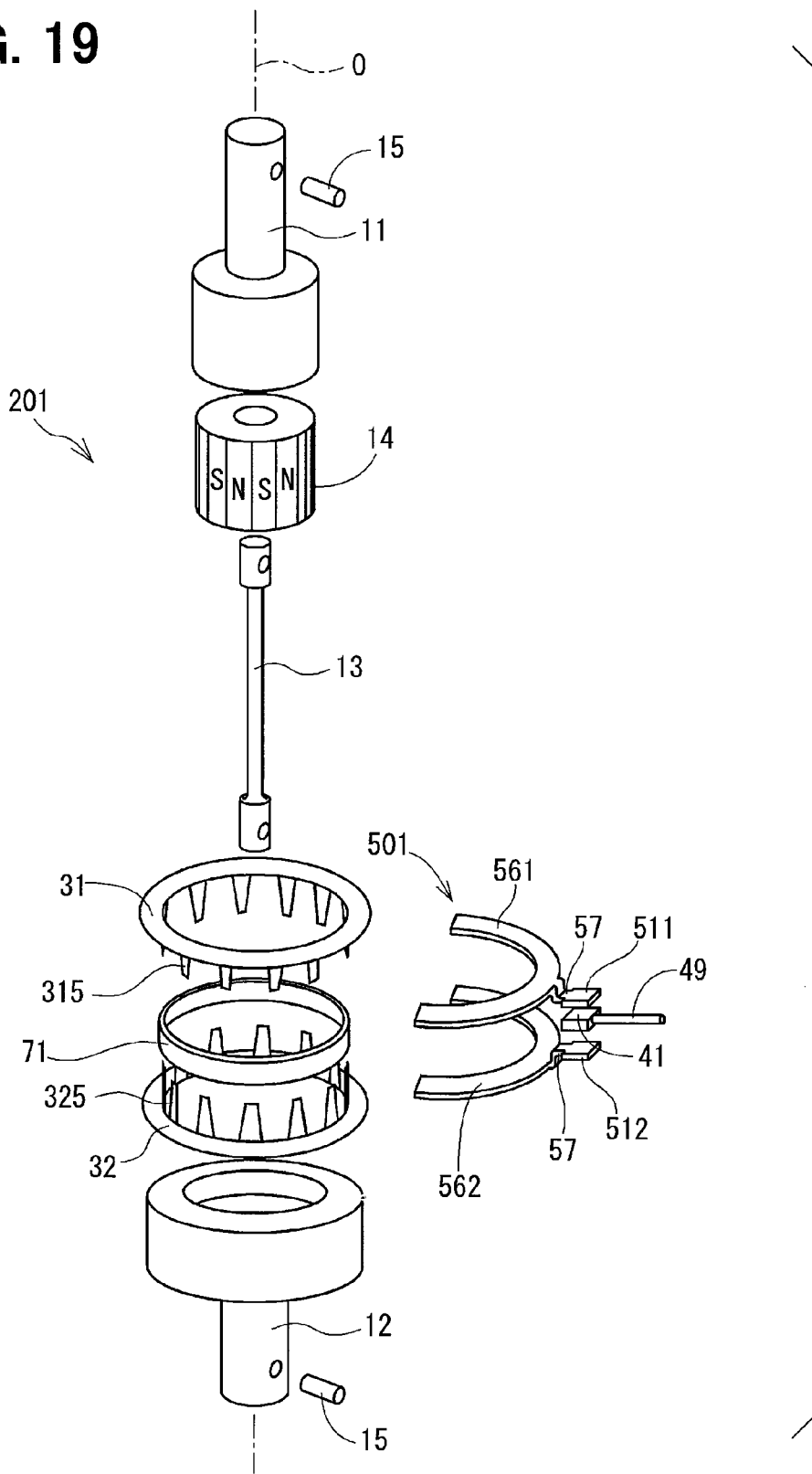
FIG. 19 is a diagram showing a perspective exploded view of a torque sensor according to an 11th embodiment.
Figure 20:
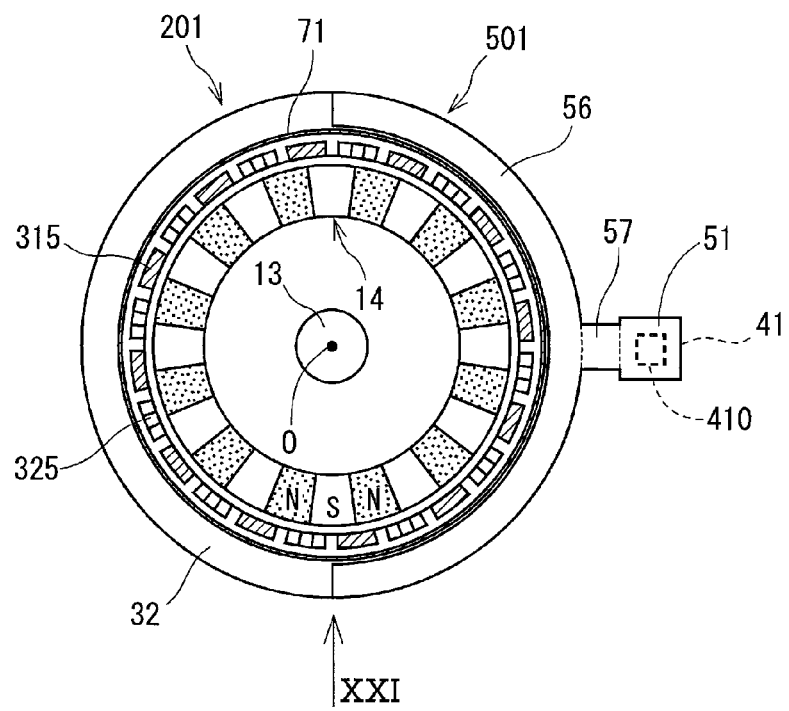
FIG. 20 is a diagram showing a section view of a torque sensor according to the 11th embodiment.

Further, as for the magnetism collecting parts 51 of the one set of magnetism collecting rings 501, when an upper magnetism collecting part is discriminated from a lower magnetism collecting part shown in FIG. 19, a numeral "1" is suffixed to the reference numeral of the upper magnetism collecting part and a numeral "2" is suffixed to the reference numeral of the lower magnetism collecting part, which is the same also in the 12th embodiment to the 14th embodiment to be described below.

As shown in FIG. 19, FIG. 21, and FIGS. 22A and 22B, the magnetic sensor 41 is interposed between a magnetism collecting part 511 and a magnetism collecting part 512. The magnetic sensor 41 is constructed in the shape of a plate-shaped IC package in which the magnetism sensing part 410 is molded with resin. Specifically, the magnetic sensor 41 is an IC package of a Hall element or a magnetic resistance element.

The torque sensor 201 is characterized by including a magnetic shielding member 71 formed in the shape of a ring. The magnetic shielding member 71 is formed of a soft magnetic material such as iron and Permalloy and is disposed between the one set of yokes 31, 32 in the axial direction and outside a magnetized peripheral face of the multi-pole magnet 14 and inside the magnetism sensing part 410 of the magnetic sensor 41 in the radial direction.

Further, in the present embodiment, the magnetic shielding member 71 is disposed outside the claws 315, 325 of the yokes 31, 32 and inside an inner edge of the main body part 56 of the magnetism collecting ring 501 in the radial direction. In other words, the magnetic shielding member 71 is disposed at a position shifted from the main body part 56 of the one set of magnetism collecting rings 501 in the radial direction.

Still further, in the present embodiment, the magnetic shielding member 71 is disposed on the side in which the magnetic shielding member 71 can turn with the multi-pole magnet 14 or the yokes 31, 32.

Here, the action of the torque sensor 201 will be described with reference to FIG. 21 and FIG. 22.

FIG. 21 shows a neutral state in which a steering wheel torque is not applied between the input shaft 11 and the output shaft 12 and in which a torsional displacement is not hence caused in the torsion bar 13. At this time, the S pole is visible at the center of the front of the multi-pole magnet 14 shown in FIG. 21. Further, the centers of the claws 315, 325 of the yokes 31, 32 coincide with the boundaries between the N poles and the S poles of the multi-pole magnet 14.

In this state, the same number of lines of magnetic force get in and out of the claws 315, 325 of the yokes 31, 32 from the N poles and the S poles of the multi-pole magnet 14, so that the lines of magnetic force form a closed loop in each of one yoke 31 and the other yoke 32. Thus, a magnetic flux does not leak into a gap between the yoke 31 and the yoke 32 and hence a magnetic flux density detected by the magnetic sensor 41 becomes zero.

Figure 22A:
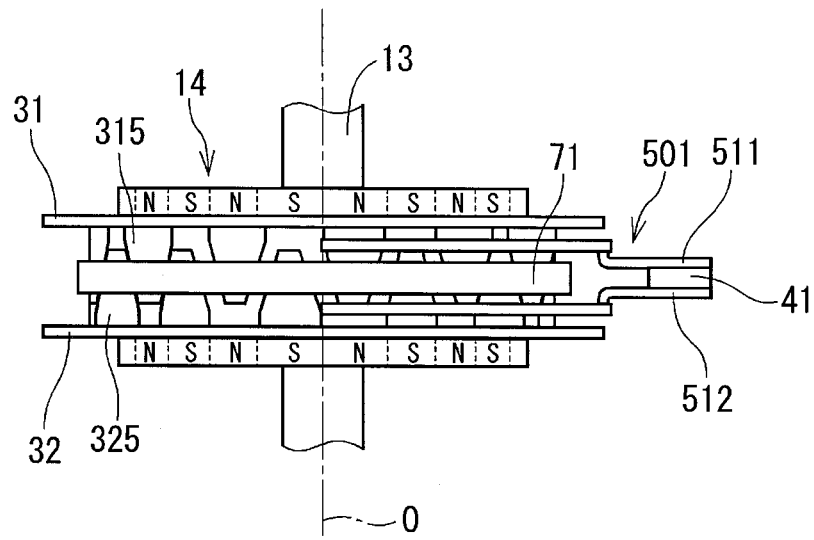
FIG. 22A is a diagram showing a front view of the torque sensor to show a state in which a multi-pole magnet is turned in a left-side direction in the torque sensor according to the 11th embodiment.
Figure 22B:
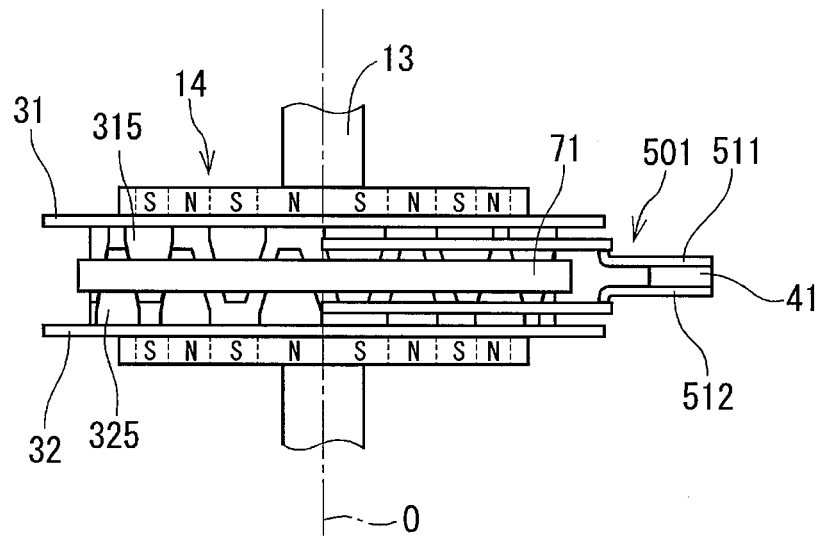
FIG. 22B is a diagram showing a front view of the torque sensor to show a state in which the multi-pole magnet is turned in a right-side direction.

When the steering wheel torque is applied between the input shaft 11 and the output shaft 12 to thereby cause the torsional displacement in the torsion bar 13, a relative position between the multi-pole magnet 14 fixed to the input shaft 11 and the one set of yokes 31, 32 fixed to the output shaft 12 is changed in the peripheral direction. FIG. 22A and FIG. 22B show states in which the multi-pole magnet 14 is turned relatively to the yokes 31, 32 from the neutral state. FIG. 22A shows a state in which the multi-pole magnet 14 is turned by 7.5° in a left direction when viewed from the front, whereas FIG. 22B shows a state in which the multi-pole magnet 14 is turned by 7.5° in a right direction when viewed from the front.

In the state shown in FIG. 22A, the claws 315 of the yoke 31 are opposite to the N poles and the claws 325 of the yoke 32 are opposite to the S poles. In the state shown in FIG. 22B, the claws 315 of the yoke 31 are opposite to the S poles and the claws 325 of the yoke 32 are opposite to the N poles. For this reason, the yoke 31 and the yoke 32 have the lines of magnetic force having opposite magnetic polarities increased in number, respectively.

As a result, the magnetic flux density passing through the magnetic sensor 41 is nearly proportional to the amount of torsional displacement of the torsion bar 13 and is reversed in magnetic polarity according to the torsional direction of the torsion bar 13. The magnetic sensor 41 detects the magnetic flux density and outputs the detected magnetic flux density as a voltage signal, whereby the torque sensor 201 detects the steering wheel torque between the input shaft 11 and the output shaft 12.

Figure 23:
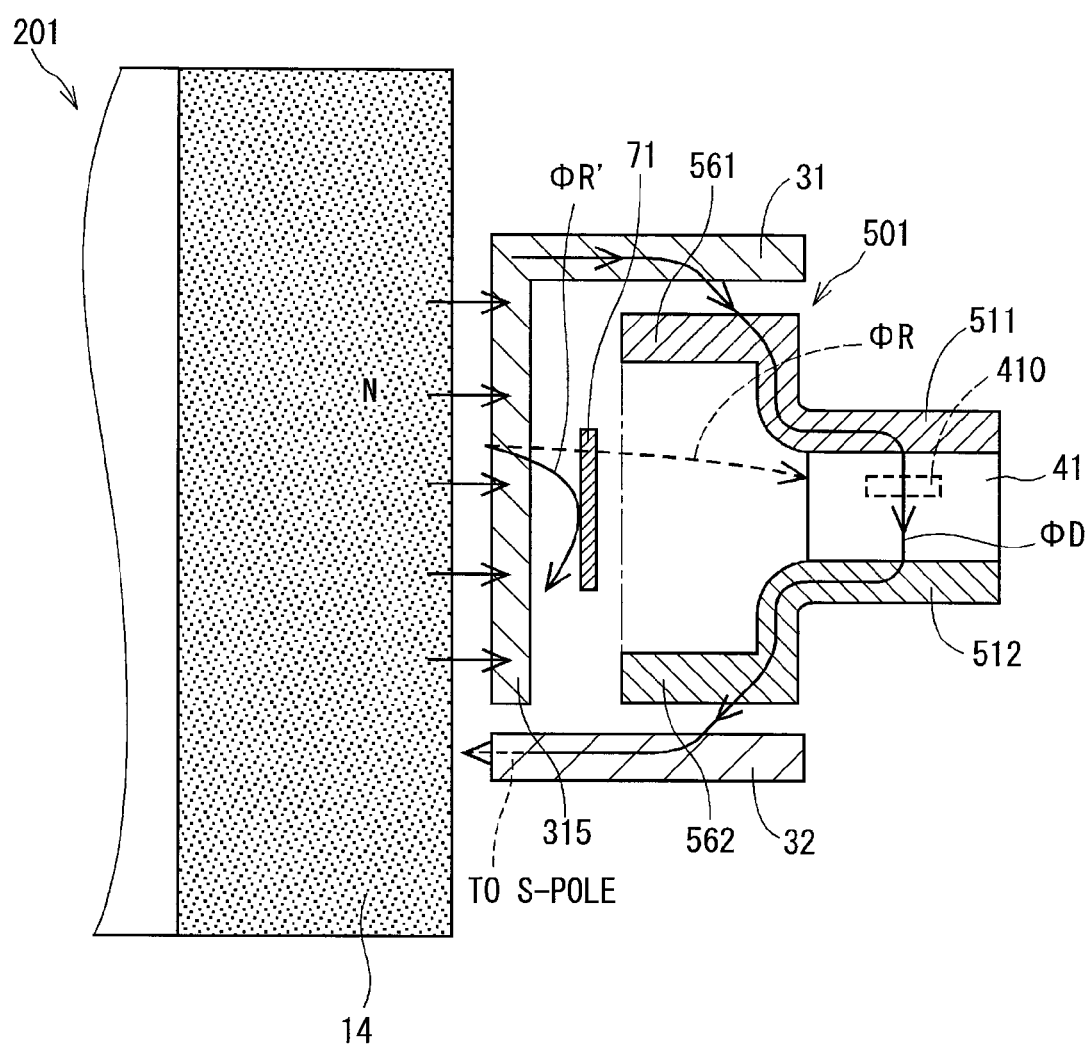
FIG. 23 is a diagram showing a schematic view of the torque sensor to illustrate an operation of a magnetic shielding member according to the 11th embodiment.
Figure 24:
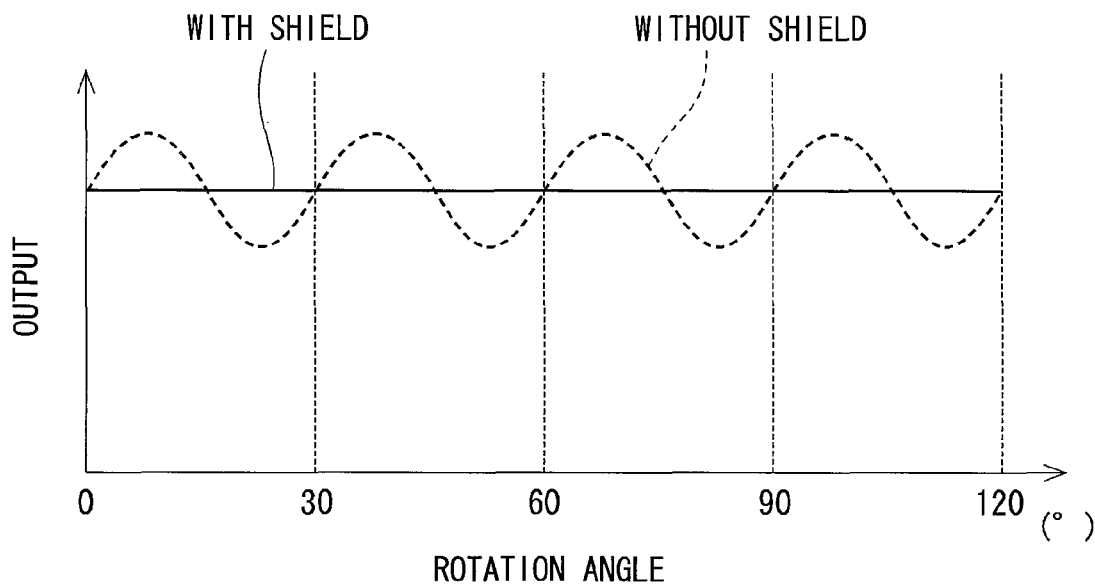
FIG. 24 is a diagram showing output characteristics of the torque sensor according to the 11th embodiment.

Referring to FIG. 23, a magnetic flux ΦD detected by the magnetic sensor 41 gets out of the N pole of multi-pole magnet 14 and passes through the yoke 31 and the magnetism collecting part 511 of the magnetism collecting ring 501 and gets in the magnetic sensor 41. Then, the magnetic flux ΦD passes through the magnetic sensor 41, the magnetism collecting part 512 of the magnetism collecting ring 501, and the yoke 32 and goes for the S pole at a section different from a section shown in the drawing of the multi-pole magnet 14.

By the way, in the torque sensor 201 of the construction described above, it is desirable that when the multi-pole magnet 14 and the yokes 31, 32 are integrally turned, the output of the magnetic sensor 41 is constant. However, in a case where the magnetic shielding member 71 is not provided, a magnetic flux ΦR shown by a broken line in FIG. 23 gets out of the multi-pole magnet 14 and does not pass through the yokes 31, 32 but passes through the space and directly reaches the magnetism sensing part 410 of the magnetic sensor 41. The output of the magnetic sensor 41 is varied by the effect of the magnetic flux ΦR.

Thus, in the present embodiment, the magnetic shielding member 71 is provided to thereby shield the magnetic flux ΦR getting out of the multi-pole magnet 14 and directly going to the magnetic sensor 41. When this is expressed by an image, a magnetic flux ΦR' radiated into the space from the multi-pole magnet 14 hits and is bounced by the magnetic shielding member 71, so that the magnetic flux ΦR' does not reach the magnetic sensor 41.

Referring to FIG. 23, it is possible to presume an optimum position at which the magnetic shielding member 71 is disposed. It is obvious that the magnetic shielding member 71 needs to be disposed between the yokes 31, 32 in the axial direction. In particular, it is desirable that the magnetic shielding member 71 includes the magnetic sensor 41 within a range in the axial direction.

It is self-evident that the magnetic shielding member 71 needs to be disposed nearer to the magnetic sensor 41 side than the claws 315, 325 of the yokes 31, 32, that is, on the outside of the claws 315, 325 in the radial direction. Further, if the magnetic shielding member 71 overlaps the main body parts 56 of the one set of magnetism collecting rings 501 in the radial direction, there is constructed a magnetic path which gets out of one main body part 56 of the magnetism collecting rings 501 and passes through the magnetic shielding member 71 and gets in the other main body part 56. Then, a portion of the magnetic flux collected in the magnetism collecting rings 501 leaks to this path, which hence results in decreasing the magnetic flux getting in the magnetic sensor 41. In order to prevent this problem, it is desired that the magnetic shielding member 71 is disposed at a position shifted from the main body parts 56 of the one set of magnetism collecting rings 501 in the radial direction.

According to the construction described above, the torque sensor 201 of the present embodiment is provided with the magnetic shielding member 71, so that the magnetic shielding member 71 can shield the magnetic flux getting out of the multi-pole magnet 14 and directly getting in the magnetic sensor 41. Hence, as shown in 24, when the multi-pole magnet 14 and the yokes 31, 32 are integrally turned, the variation in output can be reduced.

Here, in the present embodiment, the magnetic shielding member 71 is disposed on the side in which the magnetic shielding member 71 can be turned together with the multi-pole magnet 14 or the yokes 31, 32, so that a portion which is opposite to the magnetic sensor 41 and fulfills a shielding function is changed in the peripheral direction along with the turn. Hence, the magnetic shielding member 71 needs to be formed in the shape of a ring over the entire circumference.

Further, in the present embodiment is provided with the one set of magnetism collecting rings 501 and hence can efficiently collect the magnetic flux of the yokes 31, 32 in the magnetism collecting parts 51. The main body parts 56 of the one set of magnetism collecting rings 501 are formed in the shape of the semicircle, respectively, and can be assembled from the outside in the radial direction of the yokes 31, 32, which hence can improve an assembling performance as compared with a ring-shaped magnetism collecting ring.

Still further, the main body parts 56 of the one set of magnetism collecting rings 501 are disposed between the yokes 31, 32 in the axial direction and when the main body parts 56 are projected in the axial direction, the main body parts 56 overlap the yokes 31, 32 and hence can increase the amount of magnetic flux to be collected.

Subsequently, a 12th embodiment to a 14th embodiment will be described with reference to FIG. 25 to FIG. 28. In these embodiments, the arrangement in the axial direction of the magnetic shielding member is the same as in the 11th embodiment, and the arrangement and the shape in the radial direction of the magnetic shielding member are different from those in the 11th embodiment.

(12th Embodiment)

Figure 25:
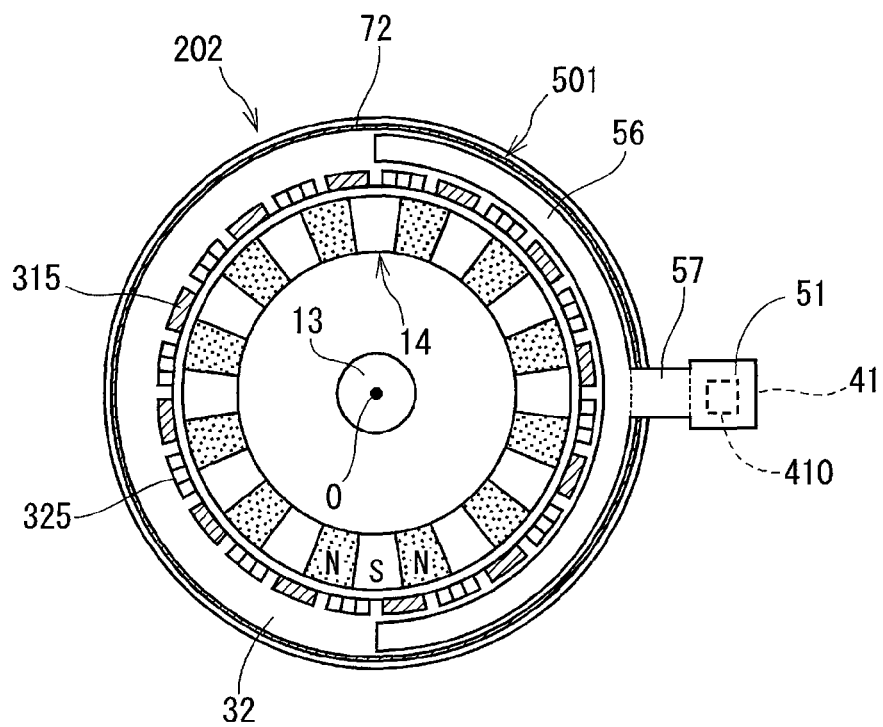
FIG. 25 is a diagram showing a section view of a torque sensor according to a 12th embodiment.
Figure 26:
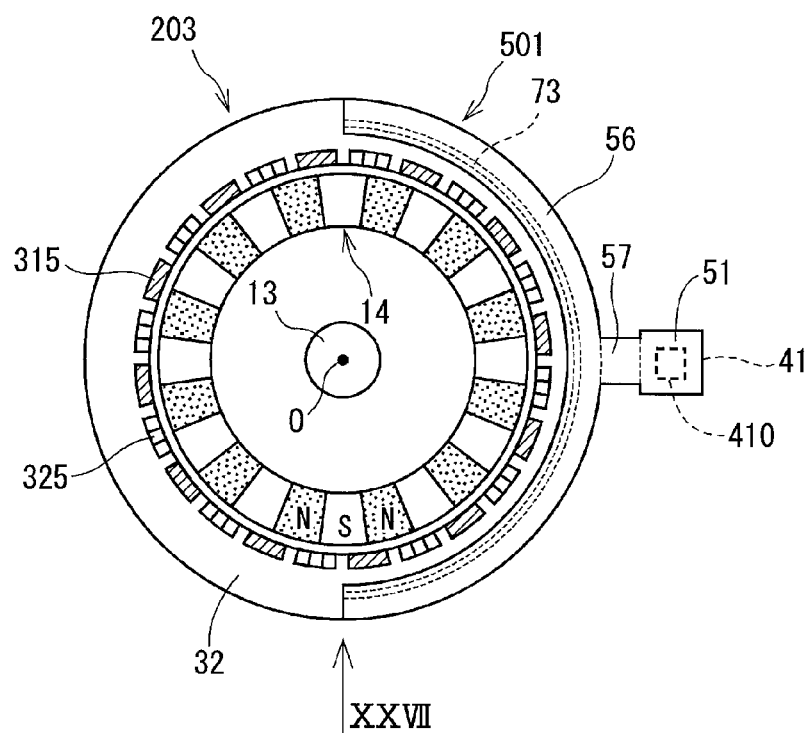
FIG. 26 is a diagram showing a section view of a torque sensor according to a 13th embodiment.
Figure 27:
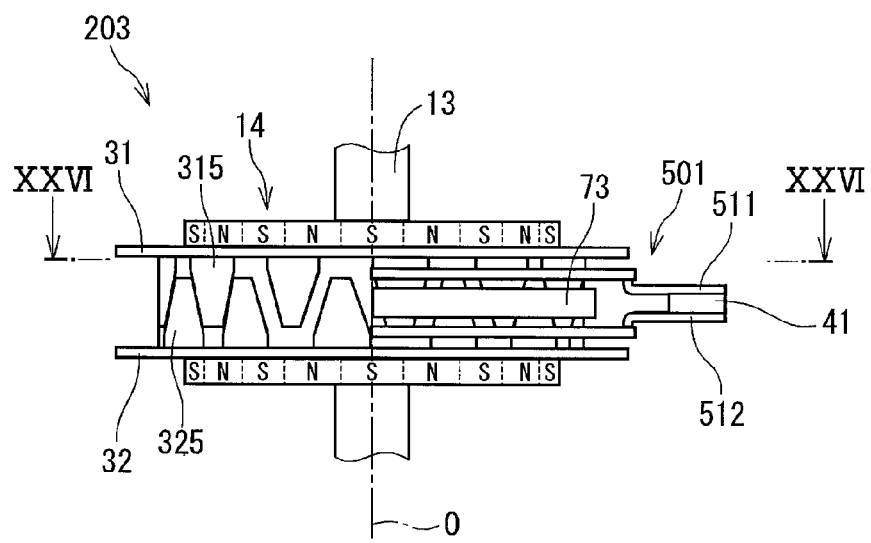
FIG. 27 is a diagram showing a front view of the torque sensor (when viewed from a direction from XXVII in FIG. 26) to show a neutral state of the torque sensor according to the 13th embodiment.
Figure 28:
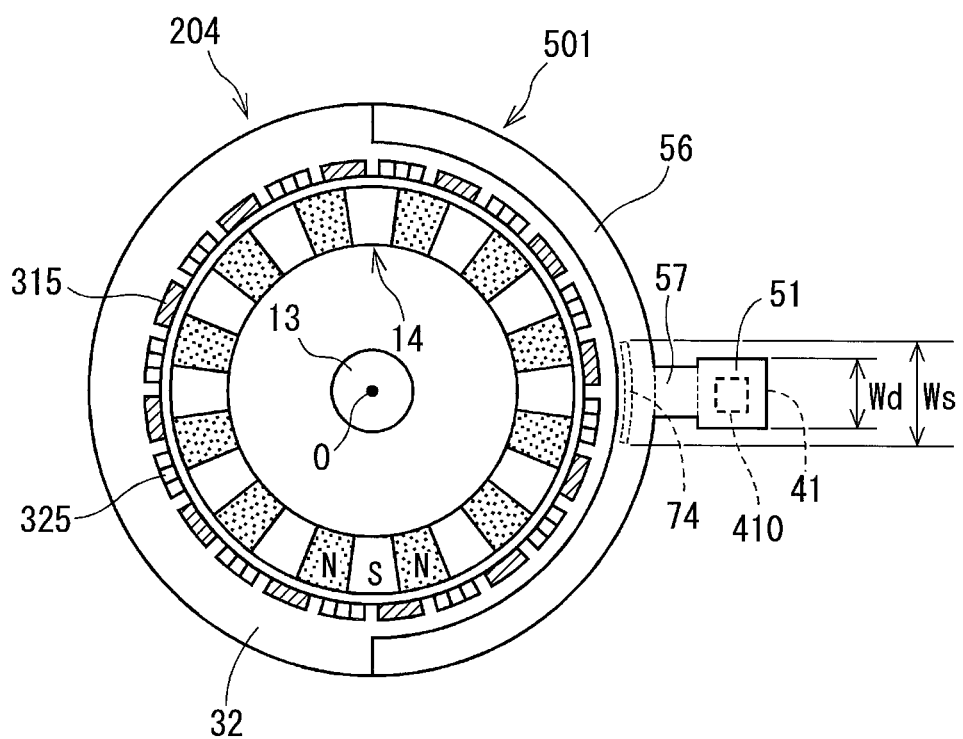
FIG. 28 is a diagram showing a section view of a torque sensor according to a 14th embodiment.
Figure 29:
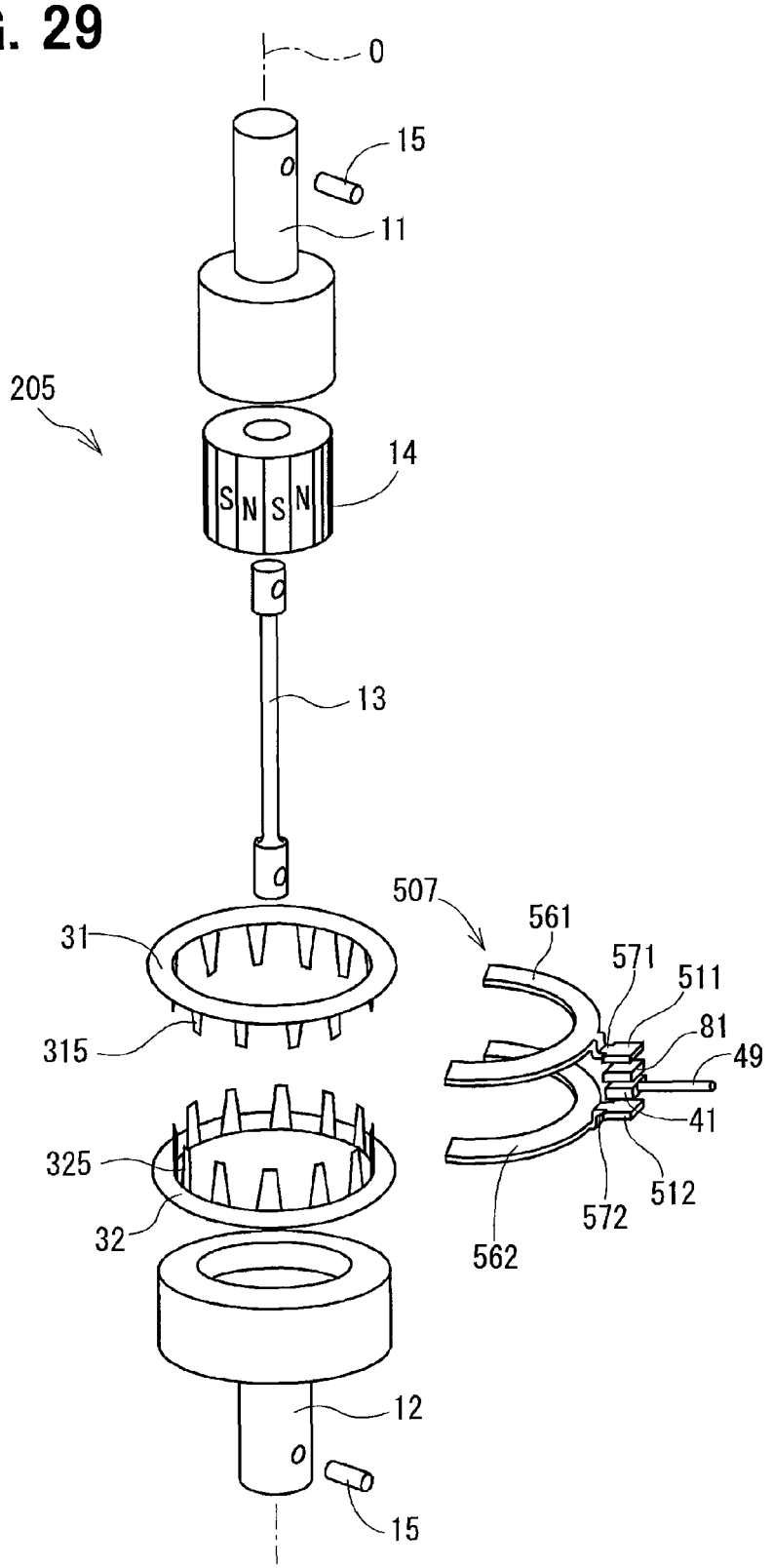
FIG. 29 is a diagram showing a perspective exploded view of a torque sensor according to a 15th embodiment.

As shown in FIG. 25, as in the case of the 11th embodiment, a torque sensor 202 of the 12th embodiment is provided with a magnetic shielding member 72 formed in the shape of a ring. The magnetic shielding member 72 is disposed on the side in which the magnetic shielding member 72 can turn together with the multi-pole magnet 14 or the yokes 31, 32.

Further, the magnetic shielding member 72 is disposed on the outside of the outer edge of the main body part 56 of the magnetism collecting ring 501 and on the inside of the magnetism sensing part 410 of the magnetic sensor 41 in the radial direction. In this case, a portion of the magnetic shielding member 72 overlaps a coupling part 57 of the magnetism collecting ring 501 in the radial direction but the most portion of the magnetic shielding member 72 is disposed at a position shifted from the main body part 56 of the magnetism collecting ring 501 in the radial direction. According to this construction, the same effect as in the 11th embodiment can be produced.

(13th Embodiment and 14th Embodiment)

A torque sensor 203 of the 13th embodiment is provided with a magnetic shielding member 73 formed in the shape of a half ring, that is, a letter C. The magnetic shielding member 73 is disposed not on a turning side but on a fixed side together with the magnetic sensor 41, which is different from the 11th embodiment and the 12th embodiment. In the case where the magnetic shielding member 73 is disposed on the fixed side, it is only necessary that the torque sensor 203 has a portion capable of fulfilling a shielding function only on the magnetic sensor 41 side in the peripheral direction, so that the magnetic shielding member 73 is formed in the shape of a letter C like this In short, in the case where the magnetic shielding member is disposed on the fixed side, as in the case of a torque sensor 204 of the 14th embodiment shown in FIG. 28, it is only necessary that a magnetic shielding member 74 of a minimum size is disposed at least in a range corresponding to a range of the magnetic sensor 41, in other words, that a width $W_s$ in the peripheral direction of the magnetic shielding member 74 is not less than a width $W_d$ in the peripheral direction of the magnetic sensor 41. By forming the magnetic shielding member 74 in a minimum size, a component cost can be reduced.

(Modified Example of the Embodiment Using the Magnetic Shielding Member)

The torque sensor of shielding the magnetic flux, which gets out of the multi-pole magnet 14 and directly goes for the magnetic sensor 41, by the magnetic shielding member does not always need to have one set of magnetism collecting rings as "one set of magnetism collecting bodies". In the case where the torque sensor does not have the one set of magnetism collecting rings, like the 10th and the 11th embodiments, it is not necessary to take it into consideration that the magnetic shielding needs to overlap the magnetism collecting rings.

[Embodiment of Reducing the Variation in Output by the Use of a Spacer]

Next, a 15th embodiment to a 17th embodiment of the present disclosure for reducing the variation in output by the use of a spacer will be described with reference to FIG. 29 to FIG. 34.

(15th Embodiment)

First, the 15th embodiment will be described with reference to FIG. 29 to FIG. 32. In a torque sensor 205 shown in FIG. 29, a magnetism collecting ring 507 on the input shaft 11 side shown in the upper side in the drawing includes a main body part 561, a coupling part 571, and a magnetism collecting part 511, whereas a magnetism collecting ring 507 on the output shaft 12 side shown in the lower side in the drawing includes a main body part 562, a coupling part 572, and a magnetism collecting part 512. Hereinafter, in order to discriminate the magnetism collecting part 511 from the magnetism collecting part 512, the magnetism collecting part 511 is referred to as "a first magnetism collecting part" and the magnetism collecting part 512 is referred to as "a second magnetism collecting part".

One pair of magnetism collecting rings 507 correspond "one set of magnetism collecting bodies".

As shown in FIG. 29 to FIG. 31B, not only the magnetic sensor 41 but also a spacer 81 are interposed between the first magnetism collecting part 511 and the second magnetism collecting part 512. In the present embodiment, the spacer 81 is interposed between the first magnetism collecting part 511 and the magnetic sensor 41. The spacer 81 is formed of a non-magnetic material such as resin.

Figure 30A:
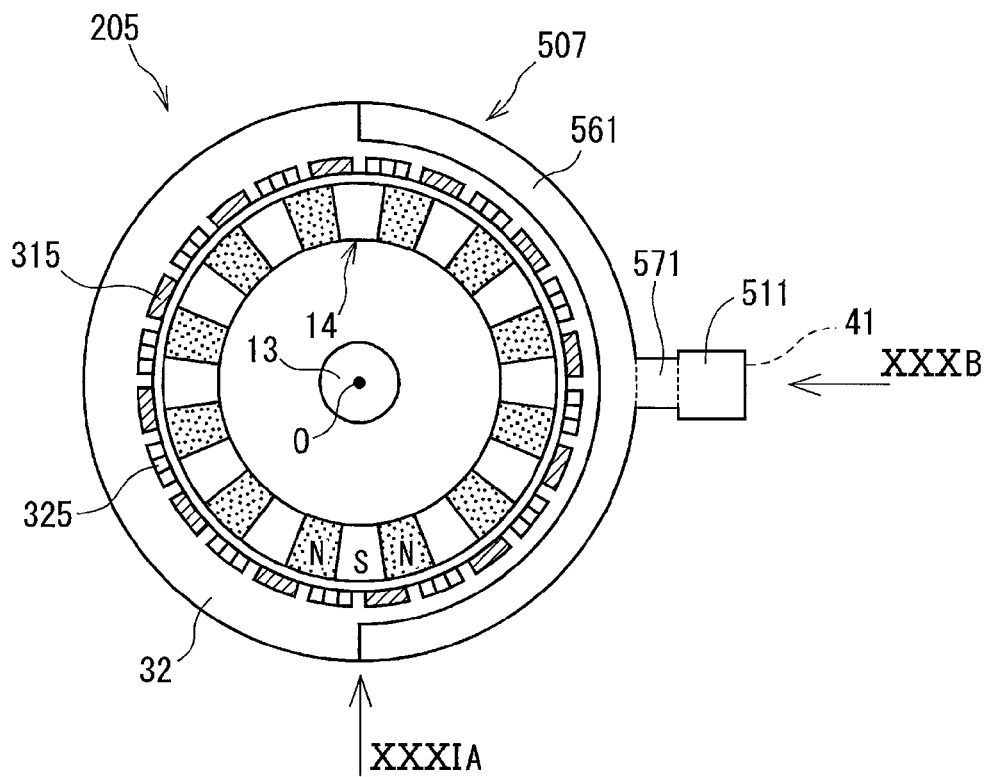
FIG. 30A is a diagram showing a section view of the torque sensor according to the 15th embodiment.
Figure 30B:
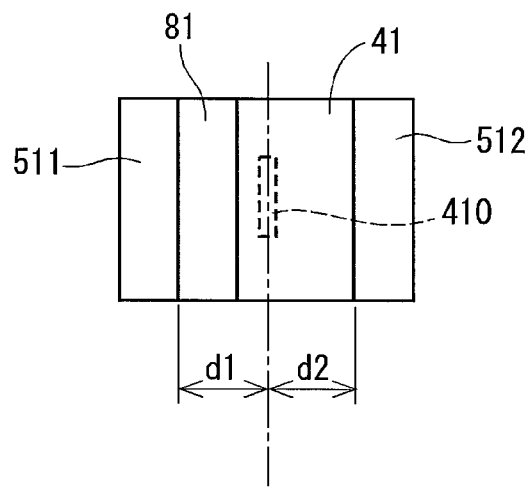
FIG. 30B is a diagram showing a view of the torque sensor when viewed from a direction shown by an arrow XXXB in FIG. 30A.
Figure 31A:
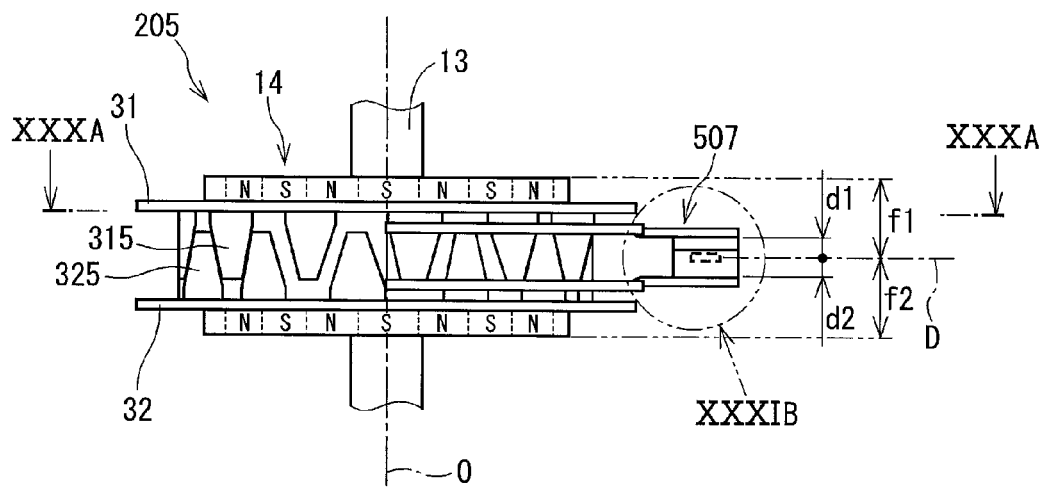
FIG. 31A is a diagram showing a front view of the torque sensor (when viewed from a direction from XXXIA in FIG. 30A) to show a neutral state of the torque sensor according to the 15th embodiment.
Figure 31B:
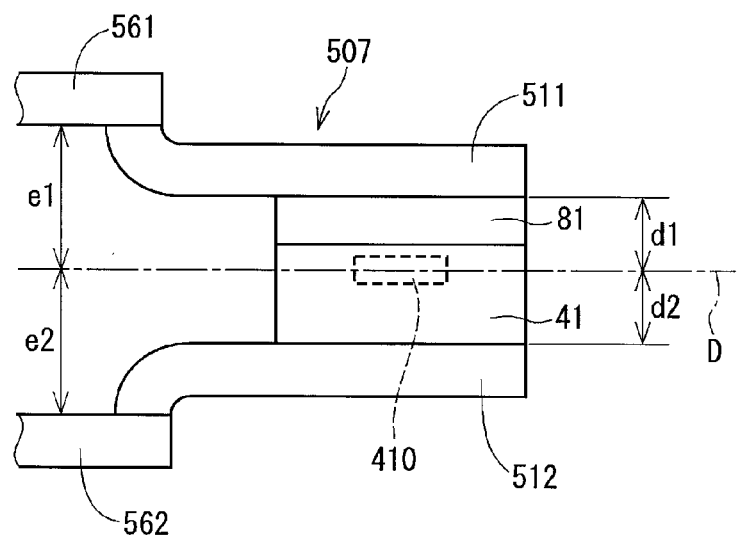
FIG. 31B is a diagram showing an enlarged view of portion XXXIB in FIG. 31A.

The magnetic sensor 41 is constructed in the form of a plate-shaped IC package in which the magnetism sensing part 410 is molded with resin. Specifically, the magnetic sensor 41 is an IC package of a Hall element or a magnetic resistance element. Here, in a generally commercially available magnetic sensor, a magnetism sensing part is disposed at a position shifted from a center in the thickness sensor of the IC package. For example, in the present embodiment, as shown in FIG. 30B and FIGS. 31A and 31B, the magnetism sensing part 410 is disposed at a position shifted to the first magnetism collecting part 511 side from a center in the thickness direction of the magnetic sensor 41.

Hence, the spacer 81 having an appropriate thickness is interposed between the first magnetism collecting part 511 and the magnetic sensor 41, whereby the magnetism sensing part 410 is arranged at a position at an equal distance from the first magnetism sensing part 511 and the second magnetism sensing part 512. In other words, in FIG. 30B and FIGS. 31A and 30B, a distance d1 from the first magnetism collecting part 511 to the magnetism sensing part 410 is adjusted to be equal to a distance d2 from the second magnetism collecting part 512 to the magnetism sensing part 410.

The spacer 81 is formed of a non-magnetic material such as resin and is equal in magnetic characteristics to a portion molded with resin of the IC package of the magnetic sensor 41. Hence, if the distance d1 is equal to the distance d2, a magnetic relationship between the first magnetism collecting part 511 and the magnetism sensing part 410 becomes equivalent to a magnetic relationship between the second magnetism collecting part 512 and the magnetism sensing part 410.

Figure 32:
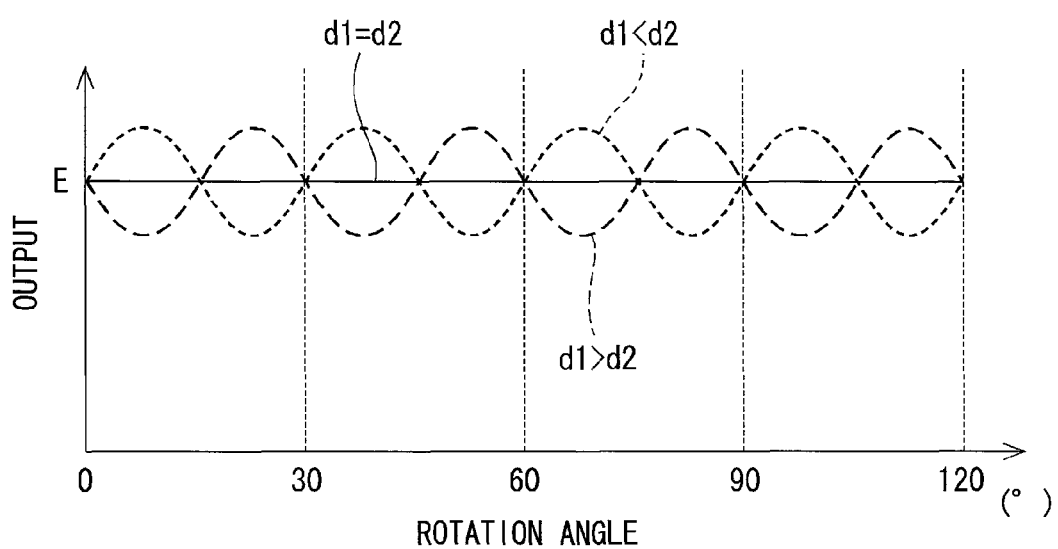
FIG. 32 is a diagram showing output characteristics of the torque sensor according to the 15th embodiment.

As shown in FIG. 32, in the case where the distance d1 is different from the distance d2, according to which of the distance d1 and the distance d2 is larger, the variation in output is caused in opposite directions to the turn angle when the multi-pole magnet 14 and the yokes 31, 32 are integrally turned. In contrast to this, in the present embodiment, by adjusting the distance d1 to be equal to the distance d2 by the use of the spacer 81, the variation in output can be reduced.

By the way, as shown in FIGS. 31A and 31B, when an imaginary plane D including the magnetism sensing part 410 and orthogonal to an axis of the torque sensor 205 is defined, in the magnetism collecting rings 507, not only the magnetism collecting parts 511, 512 but also the main body parts 561, 562 are formed symmetrically with respect to the imaginary plane D, so that distances e1, e2 from the main body parts 561, 562 to the imaginary plane D are equal to each other. Further, the multi-pole magnet 14 is also positioned symmetrically to each other with respect to the imaginary plane D, so that distances f1, f2 from both ends in the axial direction of the multi-pole magnet 14 to the magnetism sensing part 410 are equal to each other.

However, the effect of preventing the variation in output can be produced by the construction such that "the magnetism sensing part 410 is positioned at an equal distance from the first magnetism collecting part 511 and the second magnetism collecting part 512" and the symmetric property of the main body parts 561, 562 of the magnetism collecting ring 507 and the symmetric property of the multi-pole magnet 14 do not have an important meaning. Hence, in place of the 15th embodiment, the next 16th embodiment and the 17th embodiment may be employed.

(16th Embodiment and 17th Embodiment)

Figure 33:
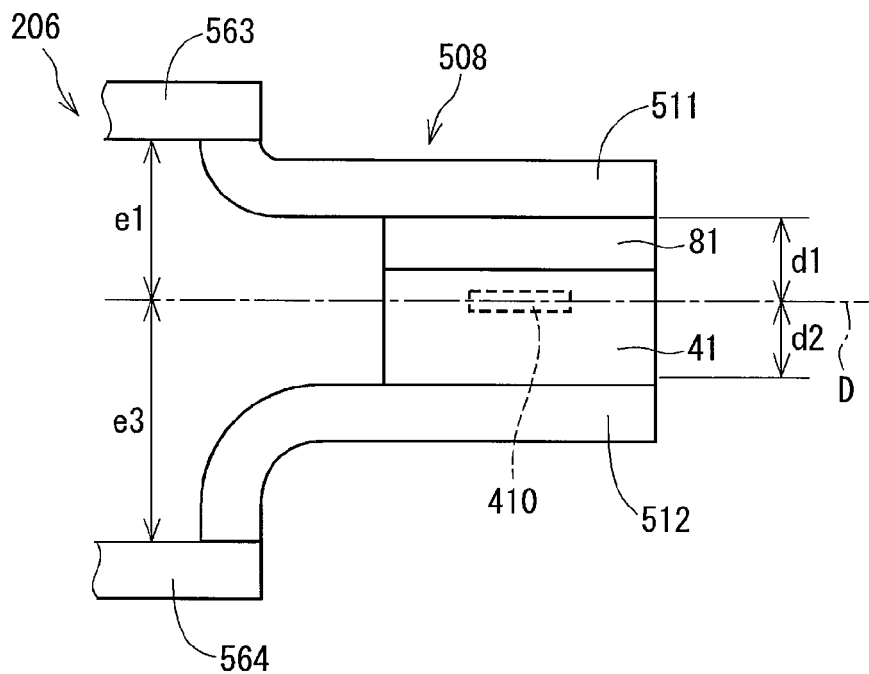
FIG. 33 is a diagram showing an enlarged view of a torque sensor according to a 16th embodiment.

As shown in FIG. 33, in a torque sensor 206 of the 16th embodiment, main body parts 563, 564 of the magnetism collecting rings 508 are asymmetric to each other with respect to the imaginary plane D. In other words, a distance e1 from the main body part 563 on the upper side in the drawing to the imaginary plane D is different from a distance e3 from the main body part 564 on the lower side in the drawing to the imaginary plane D.

Figure 34:
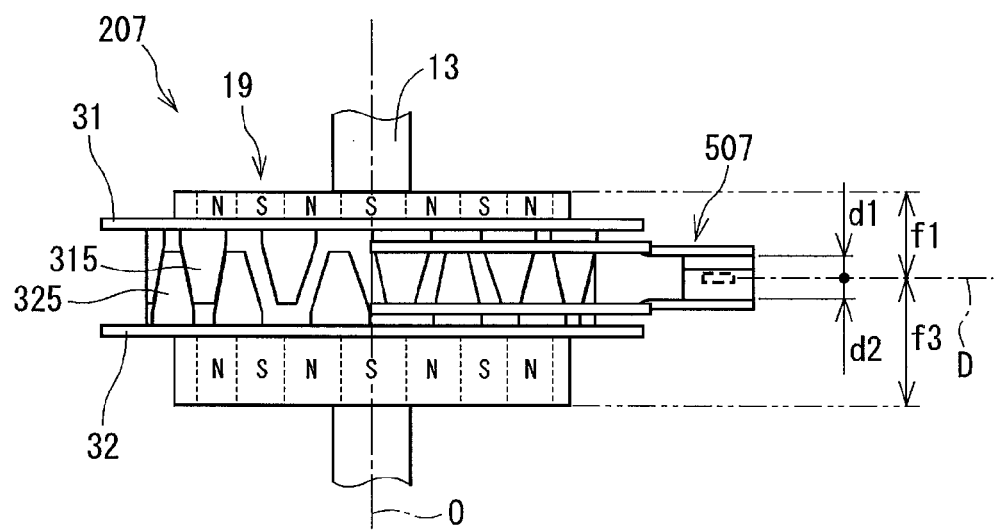
FIG. 34 is a diagram showing a front view of the torque sensor to show a neutral state of a torque sensor according to a 17th embodiment.

Further, as shown in FIG. 34, in a torque sensor 207 of the 17th embodiment, the multi-pole magnet 14 is asymmetric with respect to the imaginary plane D. In other words, a distance f1 from an upper end of the multi-pole magnet 14 to the imaginary plane D is different from a distance f3 from a lower end of the multi-pole magnet 14 to the imaginary plane D.

However, in both of the 16th embodiment and the 17th embodiment, a distance d1 from the first magnetism collecting part 511 to the magnetism sensing part 410 is equal to a distance d2 from the second magnetism collecting part 512 to the magnetism sensing part 410. Hence, as in the case of the 15th embodiment, the variation in output can be reduced.

(Modified Example of the Embodiment Using the Spacer)

The number of the spacers is not limited to one but a plurality of spacers can be combined with each other. For example, spacers having different thicknesses may be interposed between the first magnetism collecting part 511 and the magnetic sensor 41 and between the second magnetism collecting part 512 and the magnetic sensor 41, respectively. In this case, the magnetism sensing part 410 can be arranged at the center of the magnetism collecting parts 511, 512 by the use of a difference in the thickness of the two spacers.

Alternatively, it is also recommended to particularly manufacture an IC package having the magnetism sensing part 410 arranged at the center in the thickness direction. In this case, from the viewpoint of the idea of the present disclosure, it is possible to understand that a portion of a part molded with resin of the IC package includes the spacer of the present disclosure

[Other Embodiments of the Torque Sensor for Reducing the Variation in Output According to the Present Disclosure]

(A) The number of the magnetic poles of the multi-pole magnet is not always limited to 12 pairs or 24 pairs of poles. Further, the number of the claws 315, 325 of the yokes 31, 32 corresponding to this is not always limited to 12.

(B) The N pole and the S pole in the above descriptions may be reversed.

(C) In the embodiments described above, "the multi-pole magnet and one set of yokes disposed on the end of the multi-pole magnet" are fixed to the input shaft 11 side of the torsion bar 13 and "one set of intermediate yokes" are fixed to the output shaft 12 side of the torsion bar 13. In contrast to this, "the multi-pole magnet and one set of yokes disposed on the end of the multi-pole magnet" may be fixed to the output shaft 12 side of the torsion bar 13 and "the one set of intermediate yokes" may be fixed to the input shaft 11 side of the torsion bar 13.

The present disclosure is not limited to the embodiments described above but can be put into practice in various modes within a scope not departing from the gist of the present disclosure. For example, the present disclosure can be applied not only to an electric power steering device but also to various devices for detecting a shaft torque.

The above disclosure has the following aspects.

According to a first aspect of the present disclosure, a torque sensor includes: a torsion bar for coaxially coupling between a first shaft and a second shaft and for transforming a torque applied between the first shaft and the second shaft into a torsional displacement; a multi-pole magnet fixed to the first shaft or one end side of the torsion bar and having a plurality of N poles and a plurality of S poles magnetized alternately along a circumferential direction of the multi-pole magnet at every predetermined magnetizing angle; a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; and a pair of magnetic sensors arranged along the circumferential direction. Each magnetic sensor includes a magnetism sensing part for detecting a magnetic flux density generated in the magnetic circuit. Each magnetic sensor outputs a detection signal detected by the magnetism sensing part to an external computing device. The pair of magnetic sensors output the detection signals to the external computing device in such a way that the computing device calculates a sum of outputs or a difference of outputs of the pair of magnetic sensors so as to cancel a variation of the outputs produced by a magnetic flux generated from the multi-pole magnet and directly reaching the magnetism sensing parts.

In the above torque sensor, when the multi-pole magnet and the yokes are integrally turned, the variations in outputs of the respective magnetic sensors are increased or decreased in the same direction with respect to the turn angle. Hence, by computing the difference of the outputs of the magnetic sensors, the variation in output can be cancelled. In this way, according to the torque sensor, the external computing device computes the sum of outputs or the difference of outputs of the pair of magnetic sensors, thereby being able to cancel the variation in output. Hence the torque sensor can improve the detection accuracy of the turn angle.

Alternatively, the pair of magnetic sensors may be arranged adjacent to each other. The magnetism sensing parts are arranged at positions symmetric to each other with respect to a center position of the pair of magnetic sensors in the axial direction, and the pair of magnetic sensors output the detection signals to the computing device in such a way that the computing device calculates the difference of the outputs of the pair of magnetic sensors. Further, the pair of magnetic sensors may include a first magnetic sensor having a first magnetism sensing part and a second magnetic sensor having a second magnetism sensing part, and the torque sensor may further include: a third magnetic sensor. The third magnetic sensor is arranged adjacent to the second magnetic sensor; and the third magnetic sensor includes a third magnetism sensing part, which is arranged at a position symmetric to the second magnetism sensing part of the second magnetic sensor with respect to a center position between the second magnetic sensor and the third magnetic sensor in the axial direction. Furthermore, the torque sensor may further include: a fourth magnetic sensor, which is arranged adjacent to the third magnetic sensor. The fourth magnetic sensor includes a fourth magnetism sensing part, which is arranged at a position symmetric to the third magnetism sensing part of the third magnetic sensor with respect to a center position between the third magnetic sensor and the fourth magnetic sensor in the axial direction.

Alternatively, the pair of magnetic sensors may be arranged in such a way that an angle interval between the magnetism sensing parts is equal to or odd number times larger than the magnetizing angle of the multi-pole magnet, and the magnetism sensing parts are arranged at a same height from the one end side of the torsion bar in the axial direction, and the pair of magnetic sensors output the detection signals to the computing device in such a way that the computing device computes the sum of the outputs of the pair of magnetic sensors. In this case, when the multi-pole magnet and the yokes are integrally turned, the variations in outputs of the respective magnetic sensors are increased and decreased in opposite directions with respect to the turn angle. Hence, by computing the sum of the outputs of the magnetic sensors, the variation in output can be cancelled. In this way, according to the torque sensor of the present disclosure, the external computing device computes the sum of outputs or the difference of outputs of the pair of magnetic sensors, thereby being able to cancel the variation in output. Hence, the torque sensor of the present disclosure can improve the detection accuracy of the turn angle. Further, the pair of magnetic sensors may be arranged in such a way that the angle interval between the magnetism sensing parts is equal to the magnetizing angle of the multi-pole magnet. The pair of magnetic sensors may include a first magnetic sensor having a first magnetism sensing part and a second magnetic sensor having a second magnetism sensing part, and the torque sensor may further include: a third magnetic sensor, which is adjacent to the second magnetic sensor. The third magnetic sensor includes a third magnetism sensing part, which is arranged in such a way an angle interval between the second magnetism sensing part and the third magnetism sensing part is equal to the magnetizing angle of the multi-pole magnet, and the second magnetism sensing part and the third magnetism sensing part are arranged at a same height from the one end side of the torsion bar in the axial direction. Furthermore, the torque sensor may further include: a fourth magnetic sensor, which is arranged adjacent to the third magnetic sensor. The fourth magnetic sensor includes a fourth magnetism sensing part, which is arranged in such a way an angle interval between the third magnetism sensing part and the fourth magnetism sensing part is equal to the magnetizing angle of the multi-pole magnet, and the third magnetism sensing part and the fourth magnetism sensing part are arranged at a same height from the one end side of the torsion bar in the axial direction.

Alternatively, the pair of magnetic sensors may be arranged in such a way that the angle interval between the magnetism sensing parts is three times or more larger than the magnetizing angle of the multi-pole magnet.

Alternatively, the pair of magnetic sensors may be arranged in such a way that an angle interval between the magnetism sensing parts is even number times larger than the magnetizing angle of the multi-pole magnet, and the magnetism sensing parts are arranged at positions symmetric to each other with respect to a center position of the pair of magnetic sensors in the axial direction, and the pair of magnetic sensors output the detection signals to the computing device in such a way that the computing device computes the difference of the outputs of the pair of magnetic sensors. In this case, when the multi-pole magnet and the yokes are integrally turned, the variations in outputs of the respective magnetic sensors are increased or decreased in the same direction with respect to the turn angle. Hence, by computing the difference of the outputs of the magnetic sensors, the variation in output can be cancelled. In this way, according to the torque sensor of the present disclosure, the external computing device computes the sum of outputs or the difference of outputs of the pair of magnetic sensors, thereby being able to cancel the variation in output. Hence, the torque sensor of the present disclosure can improve the detection accuracy of the turn angle.

According to a second aspect of the present disclosure, a torque sensor includes: a torsion bar for coaxially coupling between a first shaft and a second shaft and for transforming a torque applied between the first shaft and the second shaft into a torsional displacement; a multi-pole magnet fixed to the first shaft or one end side of the torsion bar and having a plurality of N poles and a plurality of S poles magnetized alternately along a circumferential direction of the multi-pole magnet; a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; a magnetic sensor disposed on an outside of the pair of yokes in the radial direction, and including a magnetism sensing part for detecting a magnetic flux density generated in the magnetic circuit; and a magnetic shielding member made of a soft magnetic material. The magnetic shielding member is disposed between the pair of yokes in the axial direction. The magnetic shielding member is disposed on the outside of the multi-pole magnet and on an inside of the magnetism sensing part in the radial direction. The magnetic shielding member shields a magnetic flux generated from the multi-pole magnet and directly reaching the magnetism sensing part of the magnetic sensor.

In the above sensor, it is possible to prevent the magnetic flux from getting out of the multi-pole magnet and passing not through the yokes but through a space and directly reaching the magnetic sensor and hence to reduce a variation in output.

Alternatively, the magnetic shielding member may have a ring shape, and the magnetic shielding member is rotatable with respect to the magnetic sensor together with the multi-pole magnet or the pair of yokes. Further, the torque sensor may further include: a pair of magnetism collecting bodies for collecting the magnetic flux from the one pair of yokes into the magnetic sensor. The magnetic shielding member is disposed at a distance from a center of the multi-pole magnet in the radial direction, which is different from the pair of magnetism collecting bodies.

Alternatively, the magnetic shielding member may be fixed to the magnetic sensor. The magnetic shielding member is disposed at least within a range of the circumferential direction, which corresponds to a range of the magnetic sensor.

According to a third aspect of the present disclosure, a torque sensor includes: a torsion bar for coaxially coupling between a first shaft and a second shaft and for transforming a torque applied between the first shaft and the second shaft into a torsional displacement; a multi-pole magnet fixed to the first shaft or one end side of the torsion bar and having a plurality of N poles and a plurality of S poles magnetized alternately along a circumferential direction of the multi-pole magnet; a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; a pair of magnetism collecting bodies, each of which includes a main body part and a magnetism collecting part protruding to an outside of the main body part in a radial direction of the multi-pole magnet, for collecting a magnetic flux from the pair of yokes into the magnetism collecting part; a magnetic sensor having a magnetism sensing part, which is arranged between the magnetism collecting parts of the pair of magnetism collecting bodies and detects a magnetic flux density generated in the magnetic circuit, the magnetic sensor having a flat plate shape, in which the magnetism sensing part is arranged; and a spacer for adjusting a distance between the magnetism sensing part and the magnetic sensor in such a way that the magnetism sensing part in the magnetic sensor is arranged at an equal distance from the magnetism collecting parts of the pair of magnetism collecting bodies.

In the above sensor, a variation in output caused by a magnetic flux, which gets out of the multi-pole magnet and passes not through the yokes but through a space and directly reaches the magnetic sensor, tends to become zero at an intermediate position in an axial direction of the magnetism collecting parts. Hence, by disposing the magnetism sensing part at the intermediate position in the axial direction of the magnetism collecting parts by the spacer, the variation in output can be reduced.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A torque sensor comprising:
a torsion bar for coaxially coupling between a first shaft and a second shaft and for transforming a torque applied between the first shaft and the second shaft into a torsional displacement:
a multi-pole magnet fixed to the first shaft or one end side of the torsion bar and having a plurality of N pole and a plurality of S poles magnetized alternately along a circumferential direction of the multi-pole magnet at every predetermined magnetizing angle;
a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; and
a pair of magnetic sensors arranged along the circumferential direction, wherein:
each magnetic sensor includes a magnetism sensing part for detecting a magnetic flux density generated in the magnetic circuit;
each magnetic sensor outputs a detection signal detected by the magnetism sensing part to an external computing device;
the pair of magnetic sensors output the detection signals to the external computing device in such a way that the computing device calculates a sum of outputs or a difference of outputs of the pair of magnetic sensors so as to cancel a variation of the outputs produced by a magnetic flux generated from the multi-pole magnet and directly reaching the magnetism sensing parts;
the pair of magnetic sensors are arranged in such a way that an angle interval between the magnetism sensing parts is equal to or odd number times larger than the magnetizing angle of the multi-pole magnet, and the magnetism sensing parts are arranged at a same height from the one end side of the torsion bar in the axial direction; and
the pair of magnetic sensors output the detection signals to the computing device in such a way that the computing device computes the sum of the outputs of the pair of magnetic sensors.

2. The torque sensor according to claim 1, wherein:
the pair of magnetic sensors are arranged in such a way that the angle interval between the magnetism sensing parts is equal to the magnetizing angle of the multi-pole magnet.

3. The torque sensor according to claim 2,
the pair of magnetic sensors includes a first magnetic sensor having a first magnetism sensing part and a. second magnetic sensor having a second magnetism sensing part, the torque sensor further comprising:
a third magnetic sensor, which is adjacent to the second magnetic sensor, wherein:
the third magnetic sensor includes a third magnetism sensing part, which is arranged in such a way an angle interval between the second magnetism sensing part and the third magnetism sensing part is equal to the magnetizing angle of the multi-pole magnet, and the second magnetism sensing part and the third magnetism sensing part are arranged at a same height from the one end side of the torsion bar in the axial direction.

4. The torque sensor according to claim 3, further comprising:
a fourth magnetic sensor, which is arranged adjacent to the third magnetic sensor, wherein:
the fourth magnetic sensor includes a fourth magnetism sensing part, which is arranged in such a way an angle interval between the third magnetism sensing part and the fourth magnetism sensing part is equal to the magnetizing angle of the multi-pole magnet, and the third magnetism sensing part and the fourth magnetism sensing part are arranged at a same height from the one end side of the torsion bar in the axial direction.

5. The torque sensor according to claim 1, wherein:
the pair of magnetic sensors are arranged in such a way that the angle interval between the magnetism sensing parts is three times or more larger than the magnetizing angle of the multi-pole magnet.

6. A torque sensor comprising:
a torsion bar for coaxially coupling between a first shaft and a second shaft and for transforming a torque applied between the first shaft and the second shaft into a torsional displacement;
a multi-pole magnet fixed to the first shaft or one end side of the torsion bar and having a plurality of N poles and a plurality of S poles magnetized alternately along a circumferential direction of the multi-pole magnet at every predetermined magnetizing angle;
a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet; and
a pair of magnetic sensors arranged along the circumferential direction, wherein:
each magnetic sensor includes a magnetism sensing part for detecting a magnetic flux density generated in the magnetic circuit;
each magnetic sensor outputs a detection signal detected by the magnetism sensing part to an external computing device:
the pair of magnetic sensors output the detection signals to the external computing device in such a way that the computing device calculates a sum of outputs or a difference of outputs of the pair of magnetic sensors so as to cancel a variation of the outputs produced by a magnetic flux generated from the multi-pole magnet and directly reaching the magnetism sensing parts;

the pair of magnetic sensors are arranged in such a way that an angle interval between the magnetism sensing parts is even number times larger than the magnetizing angle of the multi-pole magnet, and the magnetism sensing parts are arranged at positions symmetric to each other with respect to a center position of the pair of magnetic sensors in the axial direction; and wherein the pair of magnetic sensors output the detection signals to the computing device in such a way that the computing device computes the difference of the outputs of the pair of magnetic sensors.

7. A torque sensor comprising:

a torsion bar for coaxially coupling between a first shaft and a second shaft and for transforming a torque applied between the first shaft and the second shaft into a torsional displacement;

a multi-pole magnet fixed to the first shaft or one end side of the torsion bar and having a plurality of N poles and a plurality of S poles magnetized alternately along a circumferential direction of the multi-pole magnet;

a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet;

a magnetic sensor disposed on an outside of the pair of yokes in the radial direction, and including a magnetism sensing part for detecting a magnetic flux density generated in the magnetic circuit; and a magnetic shielding member made of a soft magnetic material, wherein:

the magnetic shielding member is disposed between the pair of yokes in the axial direction;

the magnetic shielding member is disposed on the outside of the multi-pole magnet and on an inside of the magnetism sensing part in the radial direction; and the magnetic shielding member shields a magnetic flux generated from the multi-pole magnet and directly reaching the magnetism sensing part of the magnetic sensor.

8. The torque sensor according to claim 7, wherein:
the magnetic shielding member has a ring shape;
the magnetic shielding member is rotatable with respect to the magnetic sensor together with the multi-pole magnet or the pair of yokes.

9. The torque sensor according to claim 8, further comprising:

a pair of magnetism collecting bodies for collecting the magnetic flux from the one pair of yokes into the magnetic sensor, wherein:

the magnetic shielding member is disposed at a distance from a center of the multi-pole magnet in the radial direction, which is different from the pair of magnetism collecting bodies.

10. The torque sensor according to claim 7, wherein:
the magnetic shielding member is fixed to the magnetic sensor; and
the magnetic shielding member is disposed at least within a range of the circumferential direction, which corresponds to a range of the magnetic sensor.

11. A torque sensor comprising:

a torsion bar for coaxially coupling between a first shaft and a second shaft and for transforming a torque applied between the first shaft and the second shaft into a torsional displacement;

a multi-pole magnet fixed to the first shaft or one end side of the torsion bar and having a plurality of N poles and a plurality of S poles magnetized alternately along a circumferential direction of the multi-pole magnet;

a pair of yokes fixed to the second shaft or the other end side of the torsion bar, disposed on an outside of the multi-pole magnet in a radial direction of the multi-pole magnet, facing each other with a gap in an axial direction of the multi-pole magnet, and providing a magnetic circuit in a magnetic field generated by the multi-pole magnet;

a pair of magnetism collecting bodies, each of which includes a main body part and a magnetism collecting part protruding to an outside of the main body part in a radial direction of the multi-pole magnet, for collecting a magnetic flux from the pair of yokes into the magnetism collecting part;

a magnetic sensor having a magnetism sensing part, which is arranged between the magnetism collecting parts of the pair of magnetism collecting bodies and detects a magnetic flux density generated in the magnetic circuit, the magnetic sensor having a flat plate shape, in which the magnetism sensing part is arranged; and a spacer for adjusting a distance between the magnetism sensing part and the magnetic sensor in such a way that the magnetism sensing part in the magnetic sensor is arranged at an equal distance from the magnetism collecting parts of the pair of magnetism collecting bodies.

* * * * *